(12) United States Patent
Fujita et al.

(10) Patent No.: US 8,973,265 B2
(45) Date of Patent: Mar. 10, 2015

(54) INSTALLATION METHOD OF WATER-CHAMBER WORKING APPARATUS

(75) Inventors: Jun Fujita, Tokyo (JP); Yoshifumi Isozaki, Tokyo (JP); Atsushi Kamiyoshi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 274 days.

(21) Appl. No.: 13/516,026

(22) PCT Filed: Dec. 20, 2010

(86) PCT No.: PCT/JP2010/072911
§ 371 (c)(1),
(2), (4) Date: Jun. 14, 2012

(87) PCT Pub. No.: WO2011/086819
PCT Pub. Date: Jul. 21, 2011

(65) Prior Publication Data
US 2012/0246908 A1 Oct. 4, 2012

(30) Foreign Application Priority Data
Jan. 15, 2010 (JP) ................................. 2010-007396

(51) Int. Cl.
*B23P 6/00* (2006.01)
*B25J 9/00* (2006.01)
(Continued)

(52) U.S. Cl.
CPC *B25J 9/0018* (2013.01); *B25J 9/06* (2013.01); *F22B 37/005* (2013.01); *G21D 1/006* (2013.01); *G21D 1/02* (2013.01); *Y02E 30/40* (2013.01)
USPC ........ 29/890.031; 165/11.2; 165/76; 376/260

(58) Field of Classification Search
USPC .......... 29/890.031, 890.051; 72/53; 165/11.2, 165/76, DIG. 3; 376/260
See application file for complete search history.

(56) References Cited

U.S. PATENT DOCUMENTS 4,804,038 A * 2/1989 Klahn et al. .................. 165/11.2
5,178,820 A * 1/1993 Glass et al. ................... 376/260
(Continued)

FOREIGN PATENT DOCUMENTS

| JP | 3-208586 A | 9/1991 |
| JP | 2007-181909 A | 7/2007 |
| JP | 2007-183278 A | 7/2007 |

OTHER PUBLICATIONS

International Search Report of PCT/JP2010/072911, date of mailing Jan. 25, 2011.
(Continued)

*Primary Examiner* — Richard Chang
(74) *Attorney, Agent, or Firm* — Westerman, Hattori, Daniels & Adrian, LLP

(57) ABSTRACT

According to an installation method of a water-chamber working apparatus of the present invention, the water-chamber working apparatus includes a base that holds heat transfer tubes on a tube plate surface and is fixed to the tube plate surface, and a manipulator that is coupled with the base, suspended in a water chamber and arranged therein, and has a separable configuration. In this case, a base installing step of installing the base on the tube plate surface and a manipulator coupling step of carrying the separated manipulator (a front stage and a rear stage) into the water chamber sequentially and individually and coupling the manipulator with the base (a coupling link) are performed.

3 Claims, 21 Drawing Sheets

(51) Int. Cl.
*B25J 9/06* (2006.01)
*F22B 37/00* (2006.01)
*G21D 1/00* (2006.01)
*G21D 1/02* (2006.01)

(56) References Cited

U.S. PATENT DOCUMENTS

2008/0223106 A1 9/2008 Mori et al.

2009/0120605 A1 5/2009 Klahn et al.

OTHER PUBLICATIONS

Written Opinion of the International Searching Authority dated Jan. 25, 2011, issued in International Application No. PCT/JP2010/072911, English translation only (6 pages).

Extended European Search Report dated Nov. 29, 2013, in corresponding to European Application No. 10843173.5.

* cited by examiner

VIEW OF X

A-A SECTIONAL VIEW

INSTALLATION METHOD OF WATER-CHAMBER WORKING APPARATUS

FIELD

The present invention relates to an installation method of a water-chamber working apparatus that can facilitate an installing process of a manipulator in a configuration in which the manipulator is suspended from a ceiling of a water chamber and arranged therein.

BACKGROUND

A water-chamber working apparatus is carried into and installed in a water chamber in a steam generator to perform a work in the water chamber by remote control. In recent years, a water-chamber working apparatus provided with a manipulator having a tool for a work in a water chamber attached to an end thereof has been proposed. As a conventional water-chamber working apparatus employing such a configuration, a technique described in Patent Literature 1 is known.

CITATION LIST

Patent Literature

Patent Literature 1: Japanese Patent Application Laid-open No. 2007-183278

SUMMARY

Technical Problem

An object of the present invention is to provide an installation method of a water-chamber working apparatus that can facilitate an installing process of a manipulator in a configuration in which the manipulator is suspended from a ceiling of a water chamber and arranged therein.

Solution to Problem

According to an aspect of the present invention, in an installation method of a water-chamber working apparatus that is suspended from a tube plate surface of a water chamber in a steam generator and driven by remote control to perform a work in the water chamber, the water-chamber working apparatus includes a base that holds heat transfer tubes on the tube plate surface and is fixed to the tube plate surface, and a manipulator that is coupled with the base, suspended in the water chamber and arranged therein, and has a separable configuration. The installation method includes a base installing step of installing the base on the tube plate surface, and a manipulator coupling step of carrying the separated manipulator into the water chamber sequentially and individually and coupling the manipulator with the base.

According to the installation method of a water-chamber working apparatus, an installing process of the manipulator is facilitated in a configuration in which the manipulator is suspended from the ceiling of the water chamber and arranged therein. For example, in a configuration in which the manipulator is carried into the water chamber in an integrated state and then installed, the weight of the manipulator becomes heavy, and thus a work for hoisting the manipulator to the ceiling of the water chamber is not easy.

Advantageously, in the installation method of a water-chamber working, at the manipulator coupling step, an attaching jig is spanned from the base on the tube plate surface to a maintenance hatch of the water chamber and then installed, and the separated manipulator is coupled with the base, while being guided by the attaching jig.

According to the installation method of a water-chamber working apparatus, the attaching jig is used as a guide, and the separated manipulator is carried from the maintenance hatch of the water chamber to a position of the base. With this configuration, a heavy rear stage can be easily carried from the maintenance hatch to the base on the tube plate surface.

Advantageously, in the installation method of a water-chamber working, at the base installing step, the base and a base carrying and attaching jig installed on the tube plate surface are connected with each other via a wire, and the base is pulled up to the base carrying and attaching jig by the wire.

According to the installation method of a water-chamber working apparatus, the heavy base can be easily pulled up to the tube plate surface of the water chamber and installed therein.

Advantageously, in the installation method of a water-chamber working, replacement of a tool attached to an apical end of the manipulator is performed in a state where the apical end of the manipulator is projected from the maintenance hatch of the water chamber to outside thereof while in a state of being suspended in the water chamber.

According to the installation method of a water-chamber working apparatus, a replacement work of the tool can be performed outside of the water chamber, in a state where the water-chamber working apparatus is installed in the water chamber. With this configuration, the replacement work of the tool can be facilitated.

Advantageously, in the installation method of a water-chamber working, at a time of attaching or detaching the tool, a joint portion of the manipulator is made flexible with respect to an external force.

According to the installation method of a water-chamber working apparatus, the moment acting on the base can be reduced, and thus it is possible to prevent detaching of clamping of the base at the time of performing an attachment work and a replacement work of the tool.

Advantageous Effects of Invention

According to the installation method of a water-chamber working apparatus, an installing process of a manipulator is facilitated in a configuration in which the manipulator is suspended from a ceiling of a water chamber and arranged therein.

DESCRIPTION OF EMBODIMENTS

The present invention is explained below in detail with reference to the accompanying drawings. The present invention is not limited to the following embodiment. Furthermore, constituent elements in the embodiment include elements that can be easily replaced or obviously replaceable while maintaining the unity of invention. In addition, a plurality of modifications described in the following embodiment can be arbitrarily combined within a scope obvious to persons skilled in the art.

[Steam Generator in Nuclear Plant]

Figure 34:
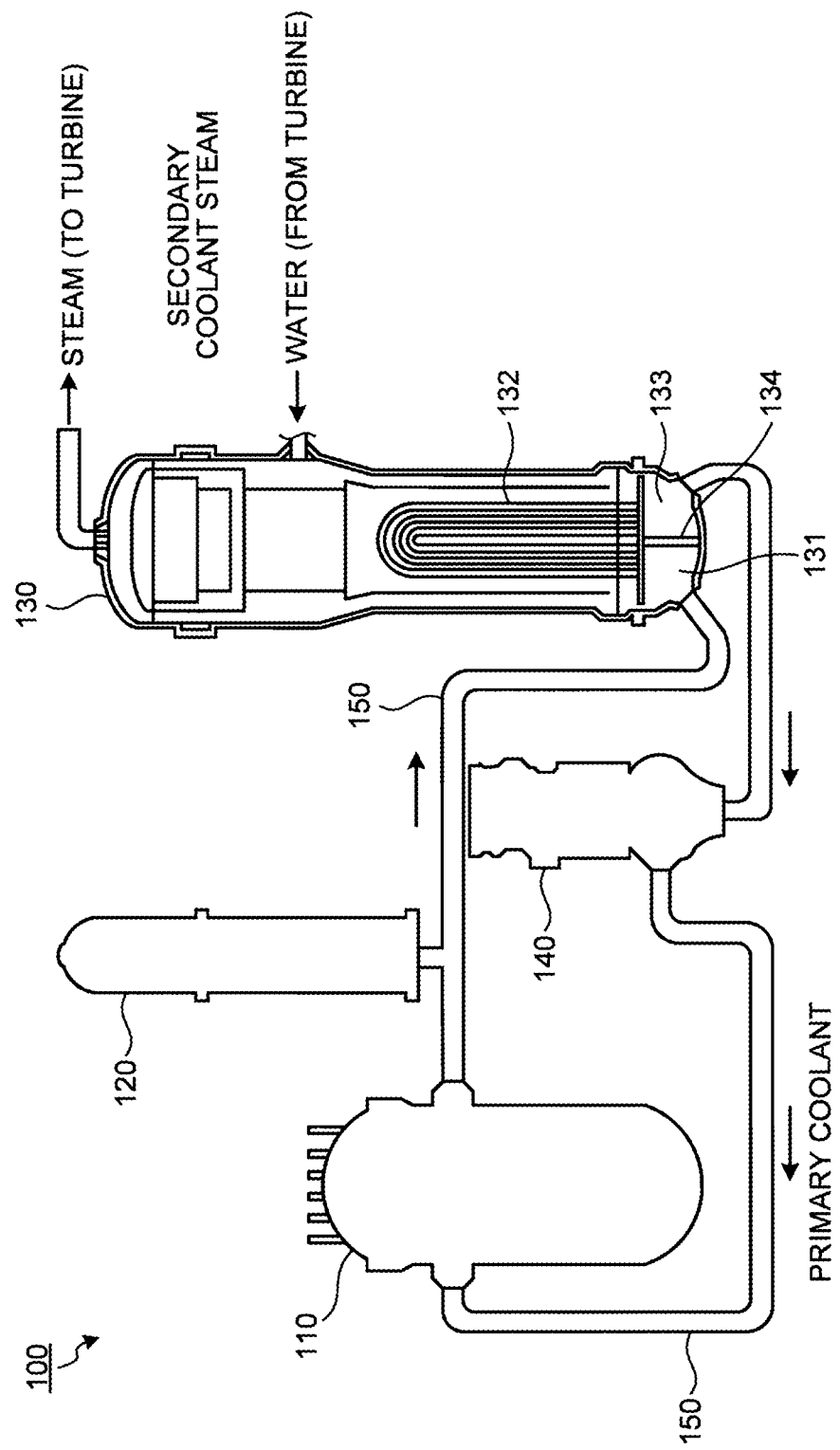
FIG. 34 is a configuration diagram of a general nuclear plant.

A nuclear plant 100 includes, for example, a pressurized light-water reactor nuclear power plant (see FIG. 34). In the nuclear plant 100, a reactor vessel 110, a pressurizer 120, a steam generator 130, and a pump 140 are sequentially coupled by a primary coolant pipe 150 so as to form a circulation pathway of a primary coolant (a primary circulation pathway). A circulation pathway of a secondary coolant (a secondary circulation pathway) is also formed between the steam generator 130 and a turbine (not shown).

In the nuclear plant 100, the primary coolant is heated in the reactor vessel 110 to become a high-temperature and high-pressure primary coolant, which is supplied to the steam generator 130 via the primary coolant pipe 150 while being pressurized by the pressurizer 120 to maintain the pressure constant. In the steam generator 130, the primary coolant flows into an inlet-side water chamber 131, and is supplied from the inlet-side water chamber 131 to a plurality of U-shaped heat transfer tubes 132. Heat exchange is performed between the primary coolant and the secondary coolant in the heat transfer tubes 132, and the secondary coolant is evaporated to generate steam. The turbine is driven by supplying the secondary coolant as the steam to the turbine so as to generate power. The primary coolant having passed through the heat transfer tubes 132 is recovered at a side of the pump 140 from an outlet-side water chamber 133 via the primary coolant pipe 150.

Figure 35:
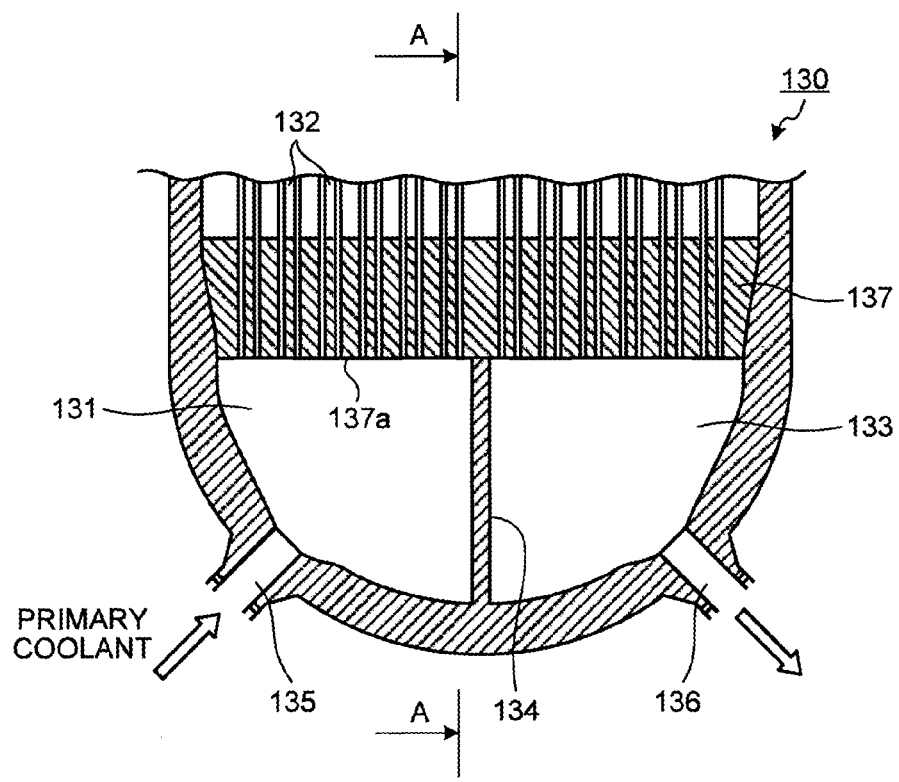
FIG. 35 is a configuration diagram of a water chamber in a steam generator of the nuclear plant shown in FIG. 34.
Figure 36:
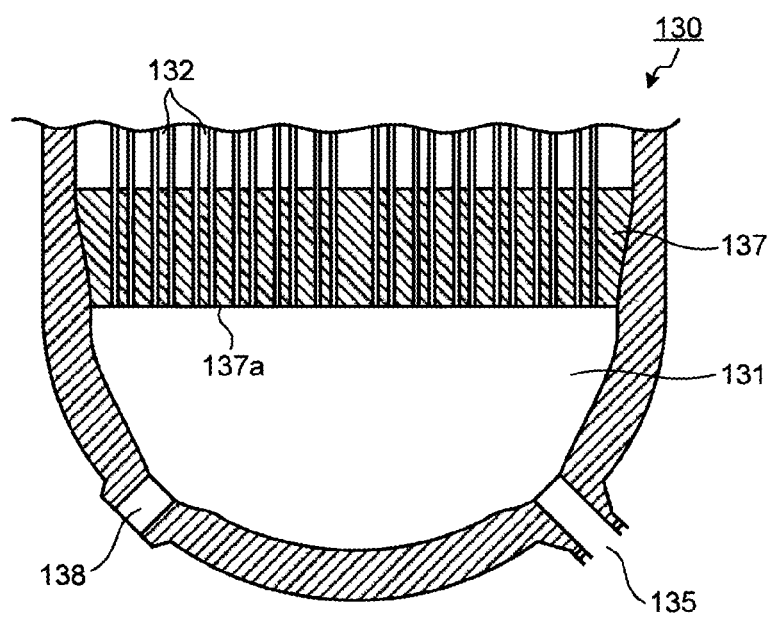
FIG. 36 is an A-A cross sectional view of the water chamber in the steam generator shown in FIG. 36.

In the steam generator 130, an inlet nozzle 135 is provided in the inlet-side water chamber 131, and the inlet-side primary coolant pipe 150 is welded and connected to the inlet nozzle 135 (see FIG. 35). An outlet nozzle 136 is provided in the outlet-side water chamber 133, and the outlet-side primary coolant pipe 150 is welded and connected to the outlet nozzle 136. The inlet-side water chamber 131 and the outlet-side water chamber 133 are divided by a partition plate 134. A tube plate 137 is installed in the steam generator 130. The tube plate 137 supports lower ends of the heat transfer tubes 132, and divides an upper part of the steam generator 130 and the water chambers 131 and 133 to constitute a ceiling of the water chambers 131 and 133. A maintenance hatch 138 from which workers enter into and exit from the water chambers 131 and 133 is provided in the inlet-side water chamber 131 and the outlet-side water chamber 133 (see FIG. 36).

[Water-Chamber Working Apparatus]

Figure 1:
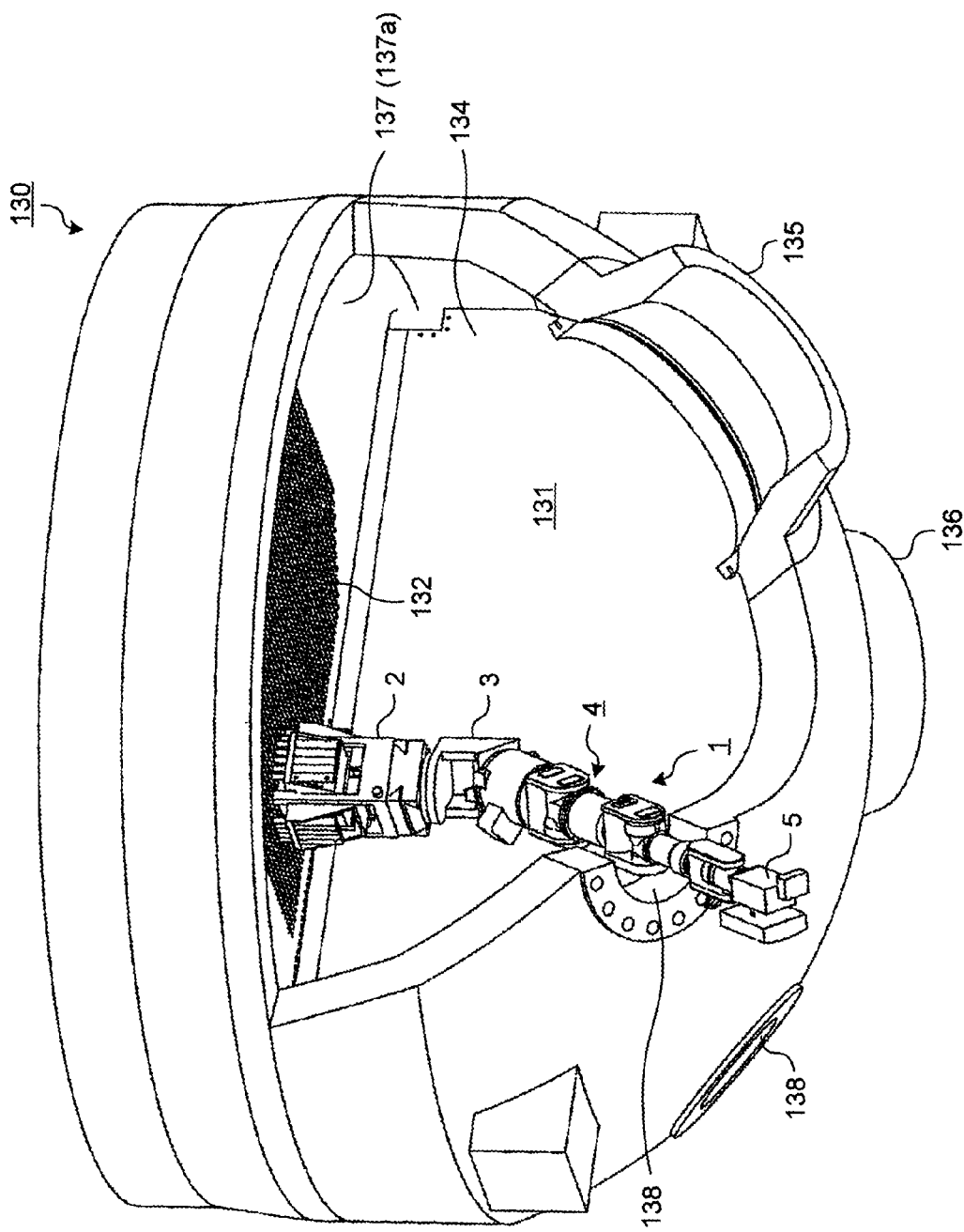
FIG. 1 is a perspective view of an installed state of a water-chamber working apparatus according to an embodiment of the present invention.
Figure 2:
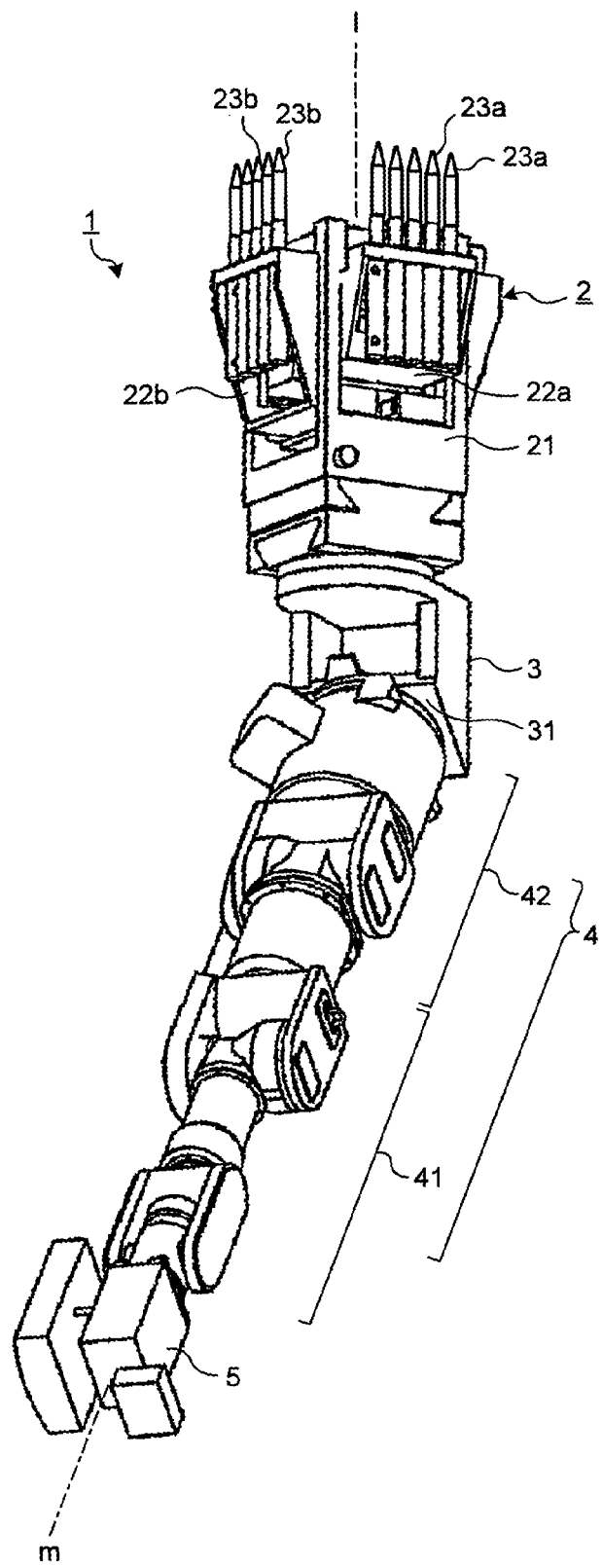
FIG. 2 is a perspective view of the water-chamber working apparatus shown in FIG. 1.
Figure 3:
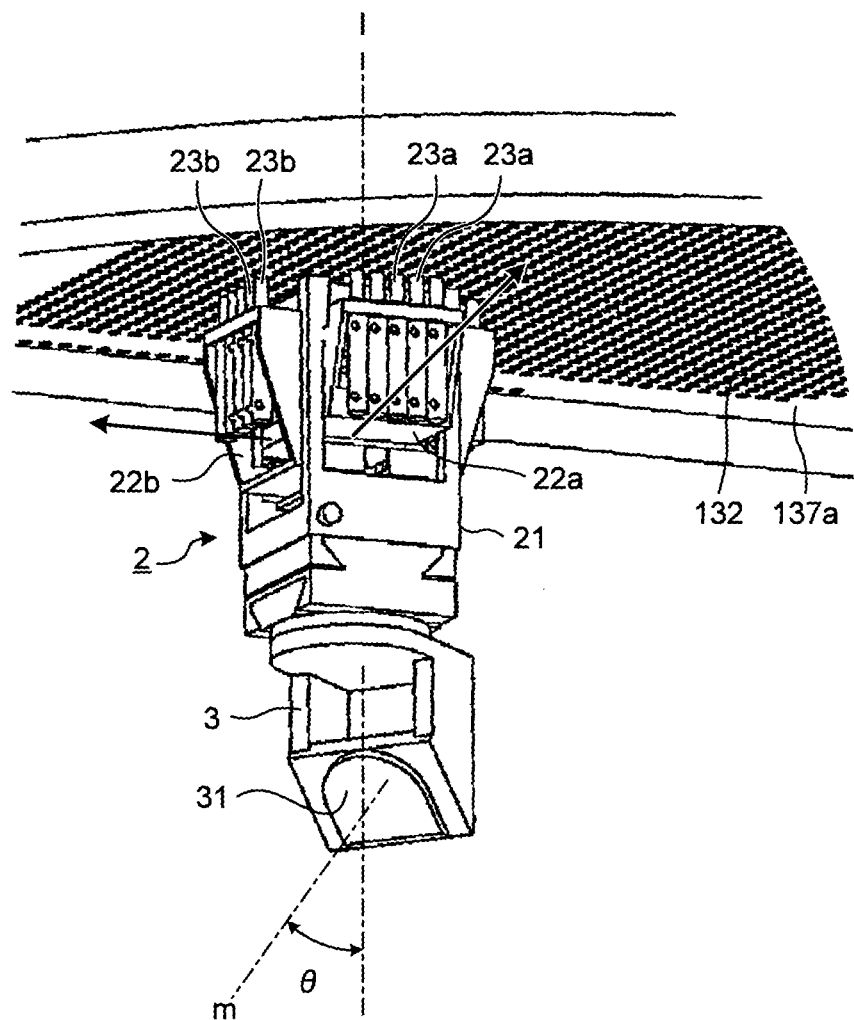
FIG. 3 is an explanatory diagram of an assembly of a base and a coupling link of the water-chamber working apparatus shown in FIG. 1.

FIG. 1 is a perspective view of an installed state of a water-chamber working apparatus according to an embodiment of the present invention. FIG. 2 is a perspective view of the water-chamber working apparatus shown in FIG. 1. FIG. 3 is an explanatory diagram of an assembly of a base and a coupling link of the water-chamber working apparatus shown in FIG. 1.

A water-chamber working apparatus 1 is carried into and installed in the water chambers 131 and 133 in the steam generator 130, and is remote-controlled to perform a work in the water chamber (see FIG. 1). The water-chamber working apparatus 1 includes a base 2, a coupling link 3, a manipulator 4, and a tool 5 (see FIG. 2).

The base 2 is a part for suspending the water-chamber working apparatus 1 from a tube plate surface 137a of the water chambers 131 and 133, and includes a base body 21, a pair of wings 22a and 22b, and a plurality of clampers 23a and 23b. The base body 21 is a framed casing. The wings 22a and 22b are inserted into and installed in the base body 21. These wings 22a and 22b are driven by an extendable ladder mechanism, and can be slidably displaced with respect to an installed position of the base body 21 (see FIG. 3). The wings 22a and 22b can be slidably displaced in mutually different directions. Furthermore, the wings 22a and 22b are driven mutually independently. The clampers 23*a* and 23*b* have a clamping mechanism for clamping the heat transfer tubes 132. For example, a configuration in which a claw-like apical end is brought into frictional contact with an inner periphery of the heat transfer tube by inserting the claw-like apical end into the heat transfer tube and widening a toe part, thereby clamping the heat transfer tube can be adopted as the clamping mechanism.

For example, in the present embodiment, the base body 21 is formed of a frame-like member having a substantially cubic shape, and the pair of wings 22*a* and 22*b* having an extension mechanism are respectively inserted into and installed in the base body 21 (see FIGS. 2 and 3). Furthermore, ends of the respective wings 22*a* and 22*b* can be slidably displaced in a width direction of the base body (in a planar direction of the tube plate surface 137*a* in the installed state) by driving the extension mechanism. Pairs of the wings 22*a* and 22*b* are arranged so that the wings can be slidably displaced in directions orthogonal to each other. A plurality of the clampers 23*a* (23*b*) in a set are brought into line and arranged, matched with an installation interval of the heat transfer tubes 132. The set of the clampers 23*a* (23*b*) are respectively arranged at the front and back of the wing 22*a* (22*b*). With this configuration, in a state where the base 2 is installed on the tube plate surface 137*a*, the clampers 23*a* (23*b*) are respectively arranged at four quarters of the base 2, and the wing 22*a* (22*b*) extends or retracts to slidably displace the end thereof, thereby enabling to slidably displace these clampers 23*a* (23*b*) in the planar direction of the tube plate surface 137*a*.

The coupling link 3 is a unit that couples the base 2 with the manipulator 4. The coupling link 3 is rotatably coupled with the base body 21 of the base 2, designating a height direction of the base 2 as a rotation axis I. Furthermore, the coupling link 3 includes a mounting surface 31, which is inclined with respect to the rotation axis I. The manipulator 4 is coupled with the mounting surface 31.

Figure 14:
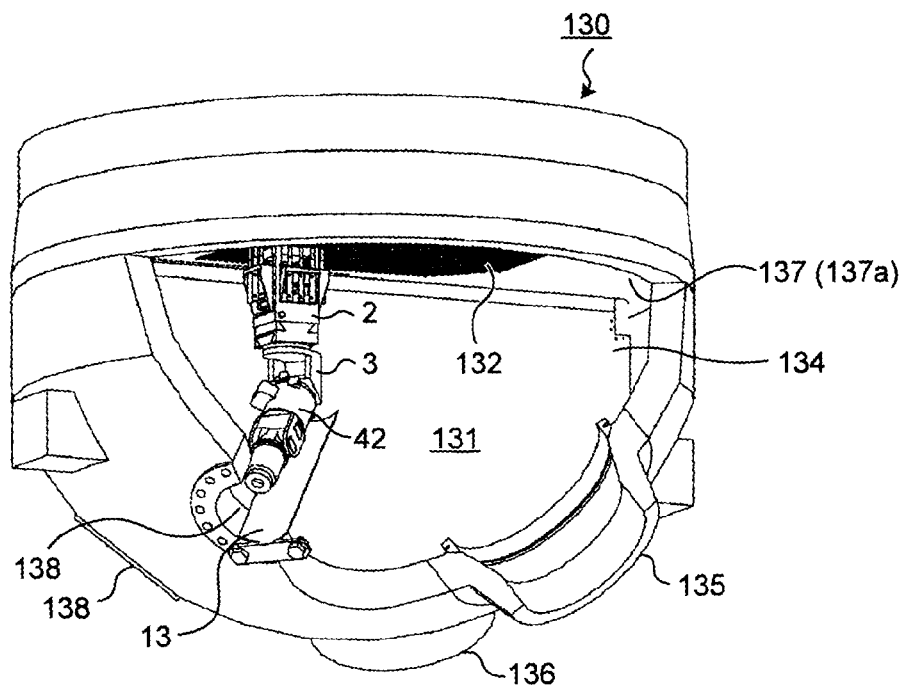
FIG. 14 is an explanatory diagram of an installing process of the water-chamber working apparatus shown in FIG. 1.

The manipulator 4 is a multi-axis manipulator. The manipulator 4 is coupled with the coupling link 3, with a reference axis m of a basic orientation thereof (an upright state) being inclined at a predetermined angle θ with respect to the rotation axis I of the coupling link 3. Furthermore, the manipulator 4 has a separable configuration that can be separated into a front stage 41 and a rear stage 42. For example, in the present embodiment, a seven-axis manipulator is adopted, and the manipulator is formed to be separable into four axes on the end side of the manipulator 4 as the front stage 41 and three axes on the rear stage side as the rear stage 42 (see FIGS. 14 and 15). The front stage 41 and the rear stage 42 have a connection structure, which can be detached by a single touch by a telescopic clamping mechanism. Specifically, a rod of the front stage 41 is inserted into a coupling hole in the rear stage 42, and the front stage 41 opens a claw by an air cylinder (not shown) and is clamped to the rear stage 42. With this configuration, the front stage 41 and the rear stage 42 can be coupled easily by remote control.

The tool 5 is a tool that corresponds to a predetermined work in a water chamber and is attached to an end of the manipulator 4. For example, the tool 5 is a maintenance work tool used for a maintenance work in the water chamber, and is constituted by a testing tool, a cutting tool, a welding tool and the like. Specifically, the tool 5 for testing or repairing the inlet nozzle 135, the outlet nozzle 136, the heat transfer tubes 132, a welded part between the partition plate 134 and the tube plate 137, and a welded part between the partition plate 134 and a water chamber mirror is prepared. In the present embodiment, a plurality of types of the tools 5 are prepared corresponding to various works in the water chamber. The tool 5 has a detachable configuration with respect to the manipulator 4 so that these tools 5 can be replaced.

[Work in Water Chamber by Water-Chamber Working Apparatus]

At the time of performing a work in a water chamber, the water-chamber working apparatus 1 is hung in a suspended state from the tube plate surface 137*a* and installed in the water chambers 131 and 133 (see FIG. 1). In this installed state, the clampers 23*a* and 23*b* of the base 2 clamp and hold the heat transfer tubes 132, thereby fixing the base 2 to the tube plate surface 137*a*. The manipulator 4 is coupled with the base 2 via the coupling link 3. Accordingly, in the installed state, the manipulator 4 is suspended from the ceiling (the tube plate surface 137*a*) of the water chambers 131 and 133 and held. The tool 5 corresponding to a work in the water chamber is attached to the end of the manipulator 4. An installing process of the water-chamber working apparatus 1 is described later.

In this example, a worker performs a work in a water chamber by remote-controlling the water-chamber working apparatus 1 from a safe area outside of the water chambers 131 and 133. Accordingly, the work in the water chamber is performed without requiring the worker to enter into the water chambers 131 and 133.

Figure 4:
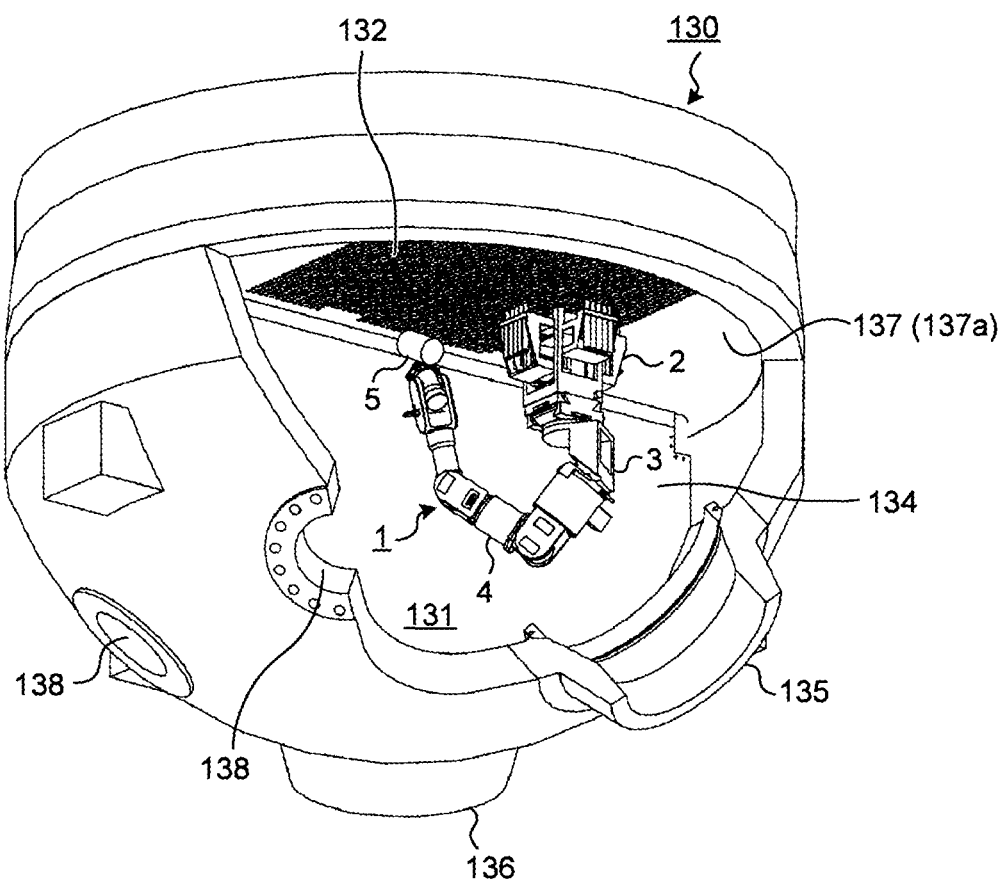
FIG. 4 is an explanatory diagram of a usage state of the water-chamber working apparatus shown in FIG. 1.
Figure 5:
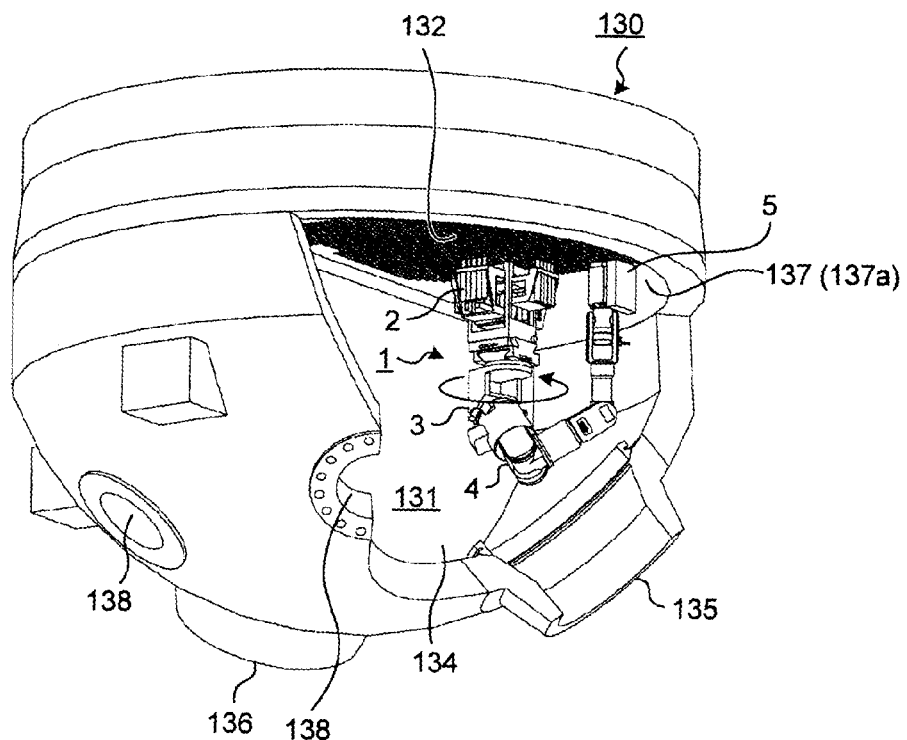
FIG. 5 is an explanatory diagram of a usage state of the water-chamber working apparatus shown in FIG. 1.

In the installed state of the water-chamber working apparatus 1, the manipulator 4 is suspended from the ceiling of the water chambers 131 and 133 (see FIG. 1). Consequently, the manipulator 4 is turned to change the orientation thereof, thereby realizing the work in the water chamber in a wide area, with the base 2 as a point of origin (see FIGS. 4 and 5). Specifically, the water-chamber working apparatus 1 is suspended from the tube plate surface 137*a* with the base 2 as a point of origin and is then installed. When the coupling link 3 is driven by remote control, the manipulator 4 turns around the rotation axis I of the coupling link 3, and the direction thereof can be changed in a circumferential direction of the water chambers 131 and 133. Furthermore, the manipulator 4 can move the tool 5 at the end to an arbitrary position in the water chambers 131 and 133 by changing its own orientation. With this configuration, because the tool 5 can be moved into every corner of the water chambers 131 and 133, the water-chamber working apparatus 1 can handle various works in the water chamber flexibly. For example, FIG. 4 depicts a state of a testing work of a welded part between the partition plate 134 and the tube plate 137, and FIG. 5 depicts a state of the testing work of the heat transfer tubes 132. As shown in FIGS. 4 and 5, it is understood that even if the base 2 is fixed in a certain position, by bending and deforming the manipulator 4 by turning, the manipulator 4 can move the tool 5 into every corner of the water chambers 131 and 133.

In the steam generator 130, because the floor surface of the water chambers 131 and 133 has a hemispherical shape, it is not easy to install the water-chamber working apparatus on the floor surface. In this respect, because the water-chamber working apparatus 1 is installed by being suspended from the ceiling (the tube plate surface 137*a*) of the water chambers 131 and 133 (see FIG. 1), an installation work on the floor surface is not required, which is preferable. For example, in a configuration in which a manipulator is supported by a pillared turning support unit and installed in a water chamber (see Patent Literature 1), workers need to enter into the water chamber to install the turning support unit, which is not preferable.

In the water-chamber working apparatus 1, in the installed state thereof, the coupling link 3 is coupled with the base 2 with the rotation axis I thereof facing downward from the tube plate surface 137*a* (see FIGS. 2 and 3). Therefore, the manipulator 4 can turn around a normal direction of the tube plate surface 137a as the rotation axis I in a state where the manipulator 4 is suspended with the base 2 as a point of origin (see FIGS. 4 and 5). Therefore, when the water chambers 131 and 133 have a quarter spherical internal shape with the tube plate surface 137a as the ceiling, a direction of the manipulator 4 can be changed in a circumferential direction of the water chambers 131 and 133. With this configuration, the tool 5 can be moved into every corner of the water chambers 131 and 133, thereby improving the workability of the work in the water chamber. In the present embodiment, the coupling link 3 is installed with the rotation axis I thereof being directed in the normal direction of the tube plate surface 137a (see FIGS. 2 and 3). However, the present invention is not limited thereto, and the rotation axis I of the coupling link 3 needs only to be downward from the normal direction of the tube plate surface 137a, and for example, the coupling link 3 can be arranged by inclining the rotation axis I by a predetermined angle with respect to the normal direction of the tube plate surface 137a.

Furthermore, in the water-chamber working apparatus 1, in the installed state thereof, the manipulator 4 is coupled with the coupling link 3, with the reference axis m of the basic position thereof being inclined at the predetermined angle θ with respect to the rotation axis I of the coupling link 3 (see FIGS. 2 and 3). In this configuration, the reference axis m of the basic position of the manipulator 4 is inclined with respect to the normal direction of the tube plate surface 137a, in a state where the manipulator 4 is suspended with the base 2 as a point of origin. Accordingly, when the water chambers 131 and 133 respectively have a quarter spherical internal shape with the tube plate surface 137a as the ceiling, the direction of the manipulator 4 can be easily changed with respect to the floor surface and the wall surface of the water chambers 131 and 133. With this configuration, the tool 5 can be moved into every corner of the water chambers 131 and 133, thereby improving the workability of the work in the water chamber.

Figure 6:
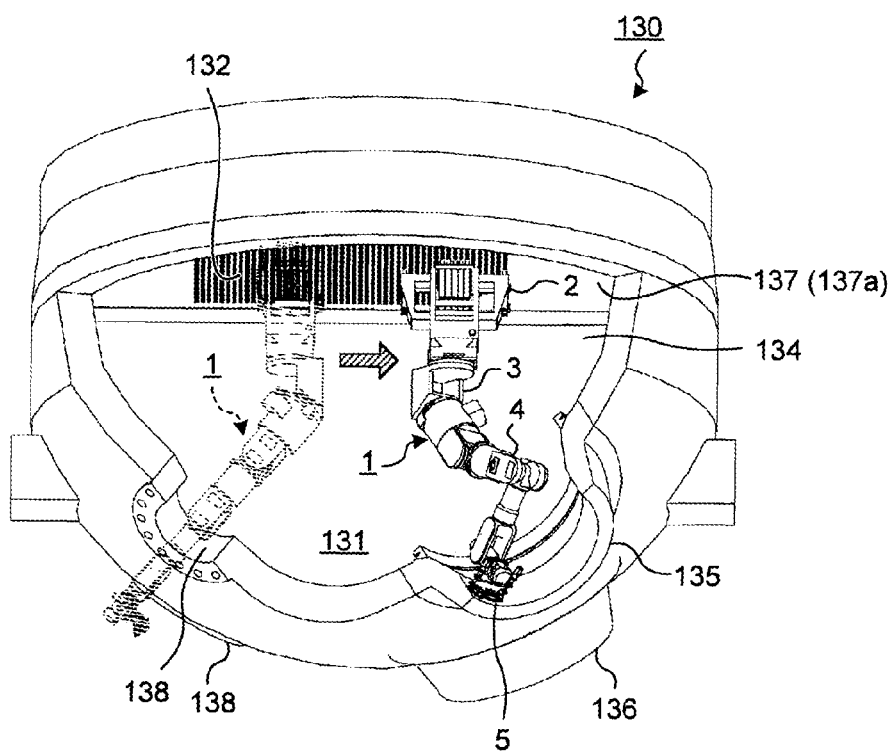
FIG. 6 is an explanatory diagram of a usage state of the water-chamber working apparatus shown in FIG. 1.
Figure 7:
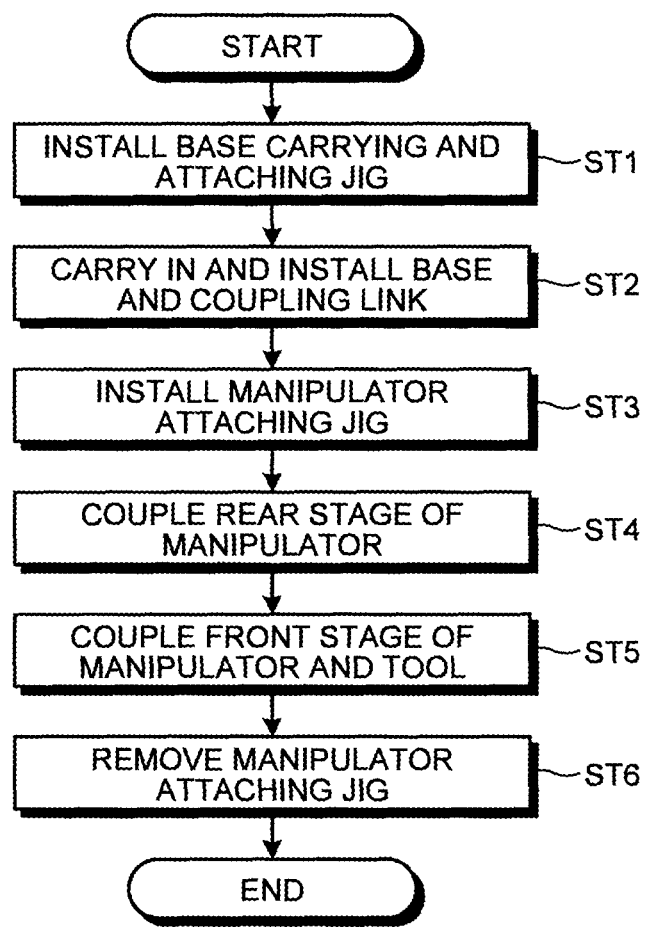
FIG. 7 is a flowchart of an installing process of the water-chamber working apparatus shown in FIG. 1.

Further, the water-chamber working apparatus 1 can be moved in the water chambers 131 and 133 within a predetermined area by moving the base 2 on the tube plate surface 137a (see FIG. 6). Specifically, the base 2 moves on the tube plate surface 137a by moving a clamping position with respect to the heat transfer tubes 132, and a position as a point of origin of the manipulator 4 (a fixed position of the base 2) can be moved on the tube plate surface 137a. With this configuration, the work in the water chamber can be performed using different positions in the water chambers 131 and 133 as a point of origin, and a work area of the work in the water chamber is expanded, thereby improving the workability of the work in the water chamber.

Particularly, in the steam generator 130, because the floor surface of the water chambers 131 and 133 has the hemispherical shape, it is not easy to move the water-chamber working apparatus on the floor surface. In this respect, the water-chamber working apparatus 1 is installed on the flat tube plate surface 137a of the water chambers 131 and 133 by being suspended from the tube plate surface 137a. With this configuration, the movement of the water-chamber working apparatus 1 in the water chambers 131 and 133 is facilitated.

The movement of the water-chamber working apparatus 1 (the base 2) is performed, for example, in the following manner. First, at the time of performing a work in the water chamber, the base 2 is fixed in a certain position by inserting the apical ends of the both clampers 23a and 23b into the heat transfer tubes 132 to clamp and hold the heat transfer tubes 132. At the time of moving the water-chamber working apparatus 1, while one of the clampers 23a (23b) clamps and holds the heat transfer tubes 132, the other one of the clampers 23b (23a) is pulled out of the heat transfer tubes 132 to release clamping to the heat transfer tubes 132. Next, the wing 22b (22a) extends (or retracts) to slidably displace its end, thereby to move the other clamper 23b (23a) along the tube plate surface 137a. Subsequently, the other clamper 23b (23a) inserts the apical ends again into the heat transfer tubes 132 to clamp and hold the heat transfer tubes 132. With this configuration, the clamping position of the other clamper 23b (23a) is moved. The one clamper 23a (23b) then moves its clamping position in the same manner, while the other clamper 23b (23a) keeps clamping and holding the heat transfer tubes 132. Because the both clampers 23a and 23b alternately move the clamping position, the base 2 can walk and move on the tube plate surface 137a.

At the time of replacing the tool 5, the manipulator 4 is remote-controlled so that an apical end thereof protrudes from the maintenance hatch 138 of the water chamber 131 or 133 toward outside of the water chamber 131 or 133, still in a state where the water-chamber working apparatus 1 is installed in the water chamber 131 or 133 (see FIG. 1). In this state, the tool 5 attached to the apical end of the manipulator 4 is replaced. Accordingly, replacement of the tool 5 can be performed outside of the water chamber 131 or 133, while the water-chamber working apparatus 1 is kept to be installed in the water chamber 131 or 133. With this configuration, replacement of the tool 5 can be facilitated.

[Installing Process of Water-Chamber Working Apparatus]

FIGS. 7 to 17 are, respectively, a flowchart (FIG. 7) and explanatory diagrams (FIGS. 8 to 17) of an installing process of the water-chamber working apparatus shown in FIG. 1. In the installing process of the water-chamber working apparatus, the water-chamber working apparatus 1 is installed in the water chamber 131 or 133 in the following manner. A case where the water-chamber working apparatus 1 is installed in the inlet-side water chamber 131 is explained below.

Figure 8:
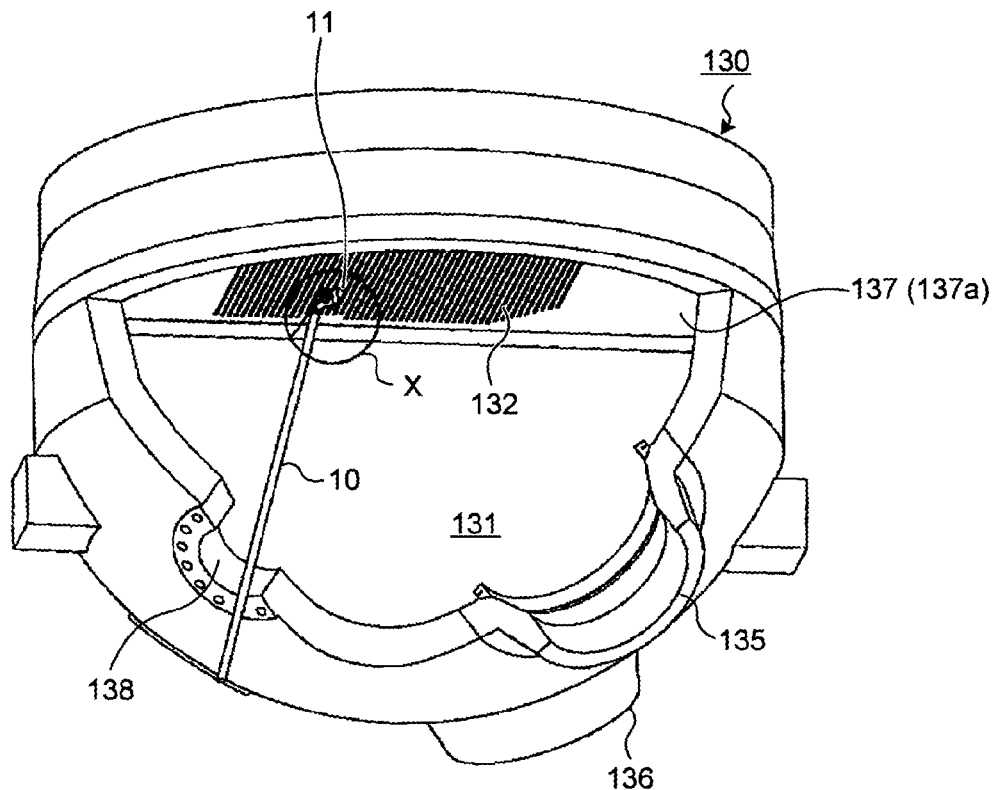
FIG. 8 is an explanatory diagram of an installing process of the water-chamber working apparatus shown in FIG. 1.

A rod-like jig 10 is inserted into the inlet-side water chamber 131 from the maintenance hatch 138, and the jig 10 is used to install a base carrying and attaching jig 11 on the tube plate surface 137a (Step ST1) (see FIG. 8). The base carrying and attaching jig 11 is a jig for attaching the base 2 to the tube plate surface 137a, and is inserted into the heat transfer tubes 132 and fixed to the tube plate surface 137a. A wire 12 for hoisting the base 2 is tied to the base carrying and attaching jig 11 (see FIG. 9).

Figure 10:
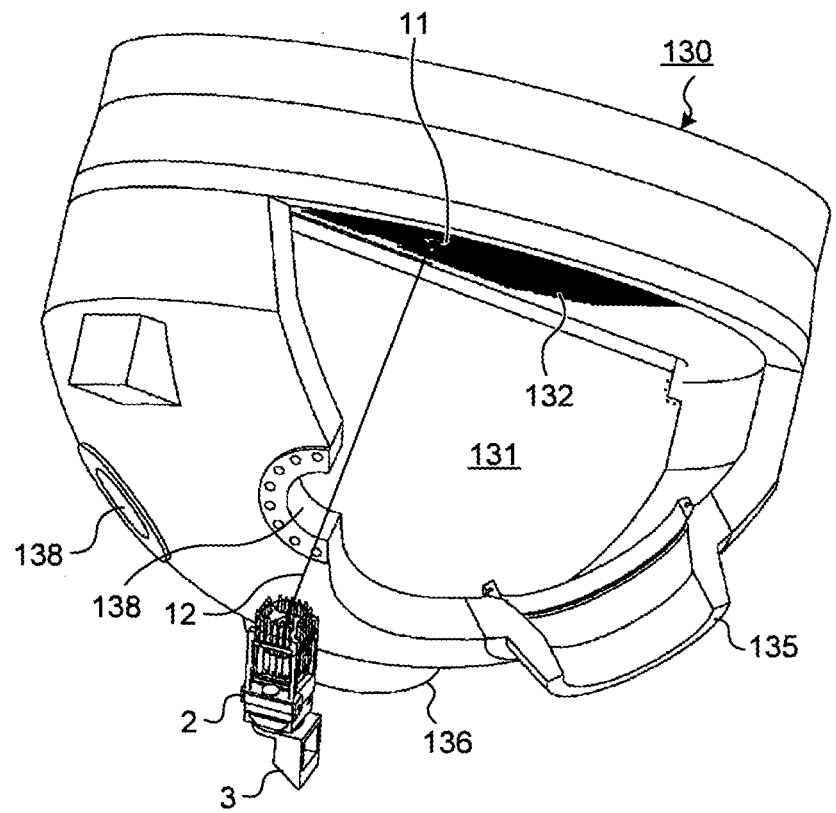
FIG. 10 is an explanatory diagram of an installing process of the water-chamber working apparatus shown in FIG. 1.

The base 2 and the coupling link 3 are carried into the inlet-side water chamber 131 and installed on the tube plate surface 137a (base installing step ST2) (see FIG. 10). At this time, the base 2 and the coupling link 3 are coupled with each other in advance and carried into the inlet-side water chamber 131. Furthermore, the base 2 is mounted with a winch 24 (see FIG. 11), and the wire 12 is wound by the winch 24 to hoist the base 2 from the maintenance hatch 138 to the tube plate surface 137a in the inlet-side water chamber 131. With this configuration, the heavy base 2 can be easily pulled up to the tube plate surface 137a of the inlet-side water chamber 131. The base 2 is then fixed to the tube plate surface 137a by inserting the apical ends of the clampers 23a and 23b into the heat transfer tubes 132 to clamp and hold the heat transfer tubes 132 (see FIG. 3). In this case, a worker pushes up the base 2 from below by using the rod-like jig 10, or pulls up the base 2 by using another rope (not shown), so that the base 2 is effectively hoisted up to the tube plate surface 137a.

Figure 12:
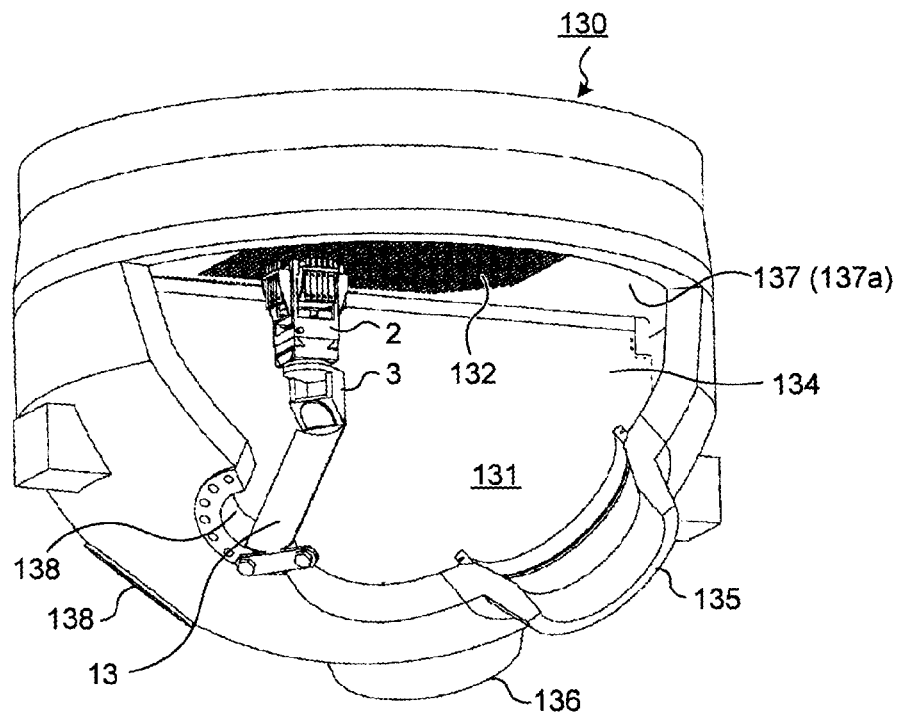
FIG. 12 is an explanatory diagram of an installing process of the water-chamber working apparatus shown in FIG. 1.

An attaching jig 13 is installed below the base 2 (Step ST3) (see FIG. 12). The attaching jig 13 is formed of a long plate-like member curved in a circular arc shape, and is used as a jig for coupling the manipulator 4 with the coupling link 3. An upper end of the attaching jig 13 is attached to a lower part of the base 2, and a lower end thereof is fixed to an inlet of the maintenance hatch 138. Accordingly, the attaching jig 13 is spanned from the lower part of the base 2 to the inlet of the maintenance hatch 138, thereby forming a slide-like guide.

Figure 13:
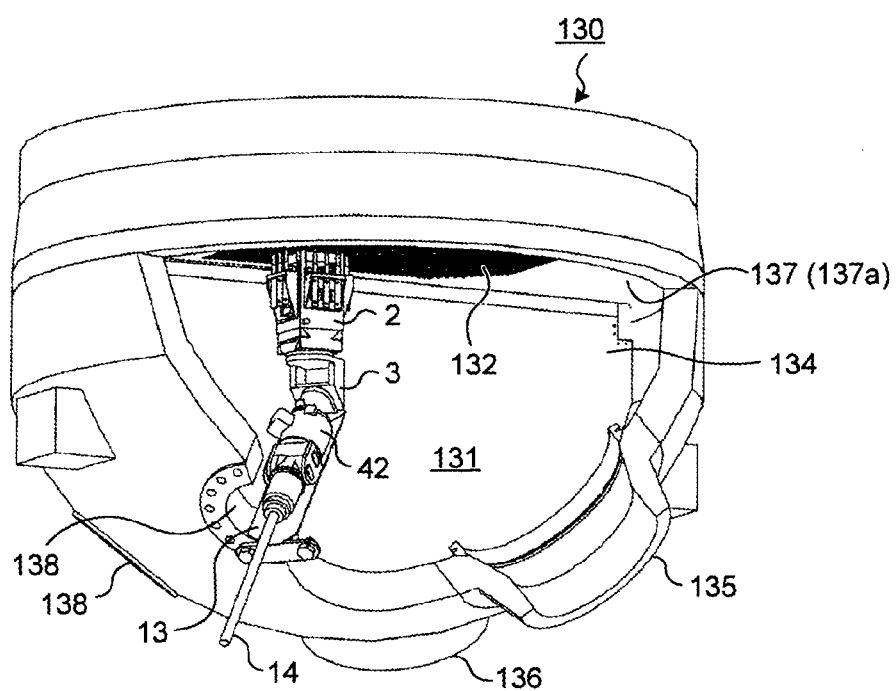
FIG. 13 is an explanatory diagram of an installing process of the water-chamber working apparatus shown in FIG. 1.

The rear stage 42 of the manipulator 4 is coupled with the coupling link 3 (Step ST4) (see FIG. 13). In this case, a rod-like jig 14 is inserted into the rear stage 42 and attached thereto. The rear stage 42 is then lifted on the attaching jig 13, pushed up by the jig 14 while being guided, and coupled with the coupling link 3. With this configuration, the heavy rear stage 42 can be easily carried from the maintenance hatch 138 to the base 2 on the tube plate surface 137a. Furthermore, the rear stage 42 can be easily guided to the coupling link 3 in the inlet-side water chamber 131 by the slide-like attaching jig 13. The jig 14 is detached from the rear stage 42 after coupling the rear stage 42 and the coupling link 3 with each other (see FIG. 14).

Figure 15:
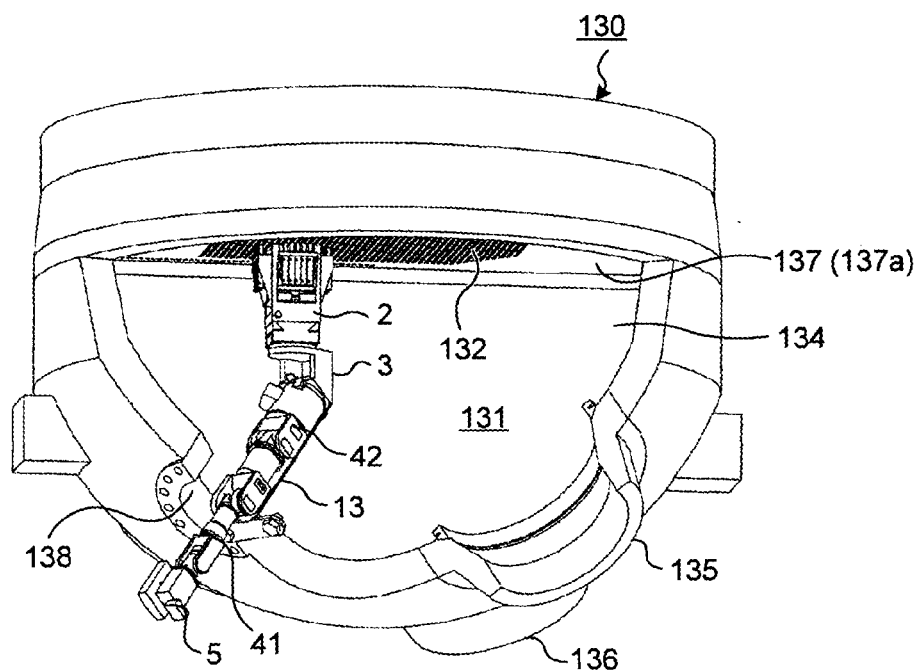
FIG. 15 is an explanatory diagram of an installing process of the water-chamber working apparatus shown in FIG. 1.
Figure 16:
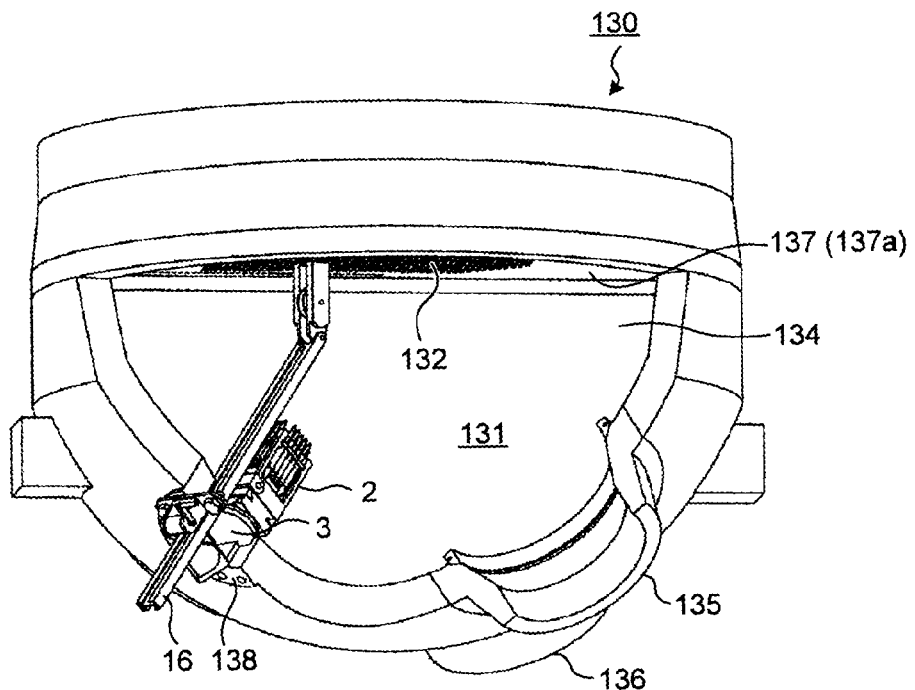
FIG. 16 is an explanatory diagram of an installing process of the water-chamber working apparatus shown in FIG. 1.
Figure 17:
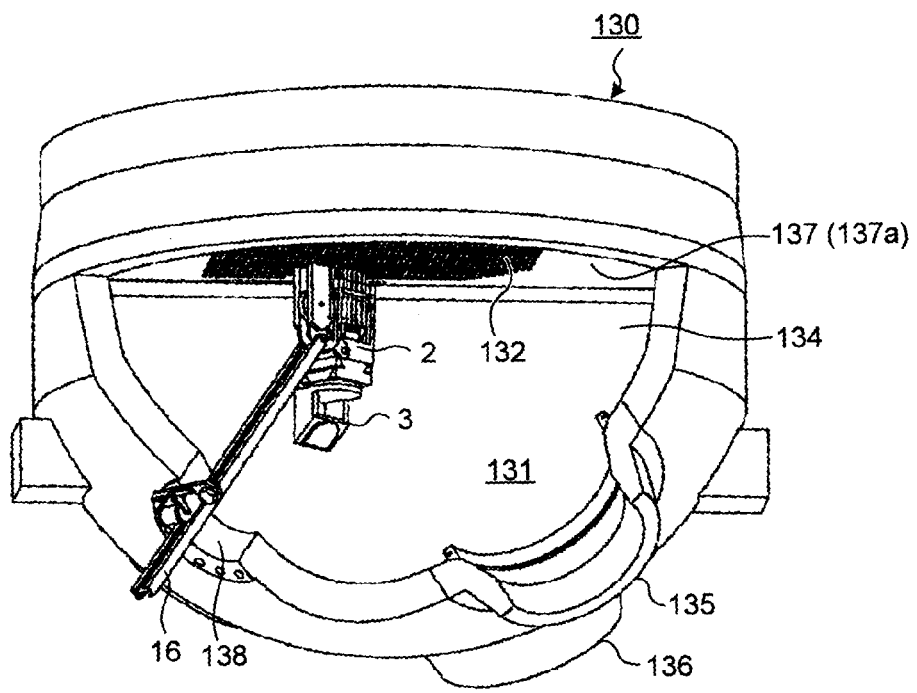
FIG. 17 is an explanatory diagram of an installing process of the water-chamber working apparatus shown in FIG. 1.

Next, the front stage 41 of the manipulator 4 is coupled with the rear stage 42 of the manipulator 4, and the tool 5 is attached to the front stage 41 (Step ST5) (see FIG. 15). At this time, the front stage 41 is lifted on the attaching jig 13, pushed up by the jig while being guided, and coupled with the rear stage 42. With this configuration, the heavy front stage 41 can be easily carried from the maintenance hatch 138 to the rear stage 42. An upper end of the front stage 41 can be easily guided to a lower end of the rear stage 42 by the slide-like attaching jig 13. This work is performed by a worker from outside of the inlet-side water chamber 131 over the maintenance hatch 138.

Subsequently, the attaching jig 13 is detached from the coupling link 3 and removed (Step ST6) (see FIG. 1). Accordingly, an installing step of the water-chamber working apparatus is complete.

In the present embodiment, the base 2 is mounted with the winch 24, the base carrying and attaching jig 11 is installed on the tube plate surface 137a (Step ST1), and the wire 12 attached to the base carrying and attaching jig 11 is wound by the winch 24, thereby installing the base 2 by hoisting the base 2 up to the tube plate surface 137a in the inlet-side water chamber 131 (Step ST2) (see FIGS. 8 to 11). However, the present invention is not limited thereto, and for example, the base 2 can be installed on the tube plate surface 137a by using a small crane device 16 that can be fixed in the maintenance hatch 138 (see FIGS. 16 and 17).

Figure 11:
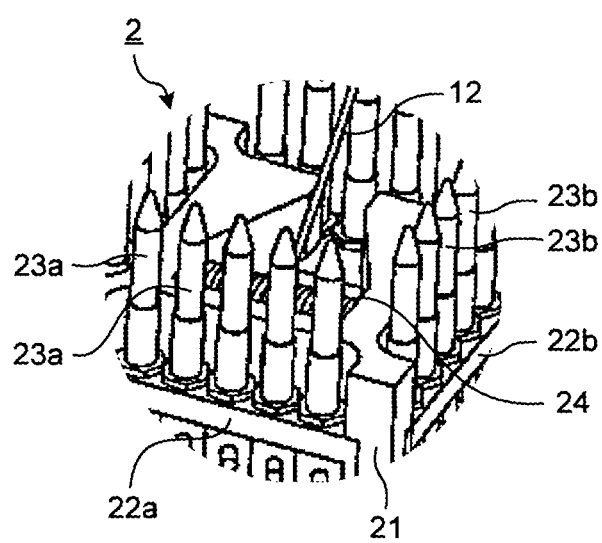
FIG. 11 is an explanatory diagram of an installing process of the water-chamber working apparatus shown in FIG. 1.

In the present embodiment, the winch 24 to be used at the time of carrying the base 2 into the inlet-side water chamber 131 (Step ST2) is mounted on the base 2 (see FIG. 11). However, the present invention is not limited thereto, and the winch 24 can be mounted on the base carrying and attaching jig 11 installed on a side of the tube plate surface 137a (this arrangement is not shown).

Figure 9:
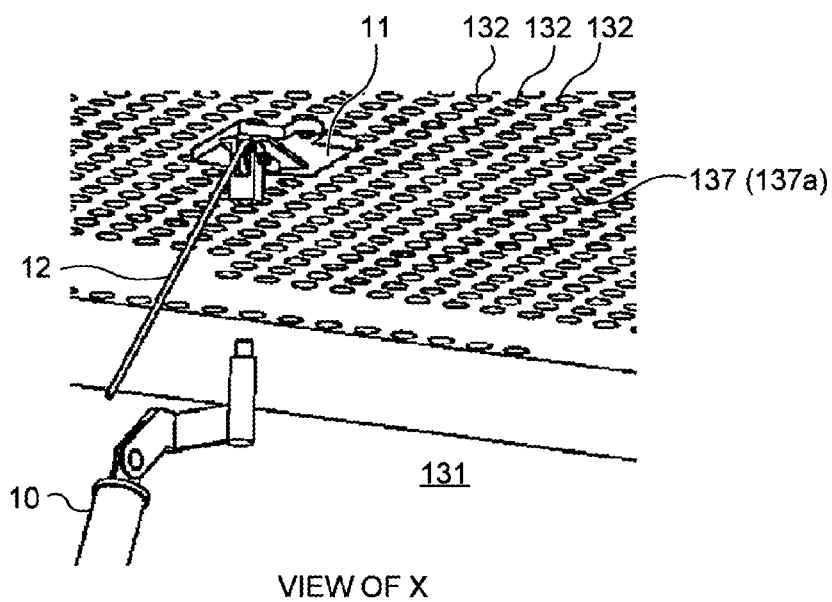
FIG. 9 is an explanatory diagram of an installing process of the water-chamber working apparatus shown in FIG. 1.

In the present embodiment, the base carrying and attaching jig 11 is installed on the tube plate surface 137a by using the rod-like jig 10 (Step ST1) (see FIGS. 8 and 9). However, the present invention is not limited thereto, and for example, the base carrying and attaching jig 11 can be installed on the tube plate surface 137a by using the small crane device 16 that can be fixed in the maintenance hatch 138 (see FIGS. 16 and 17).

EXAMPLE

[Specific Example of Base]

Figure 18:
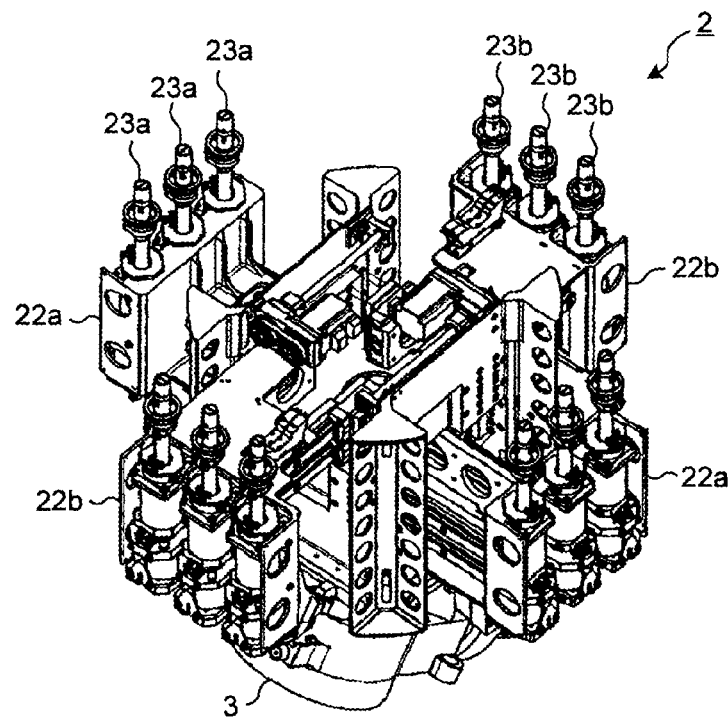
FIG. 18 is a perspective view of an Example of the base of the water-chamber working apparatus shown in FIG. 1.
Figure 19:
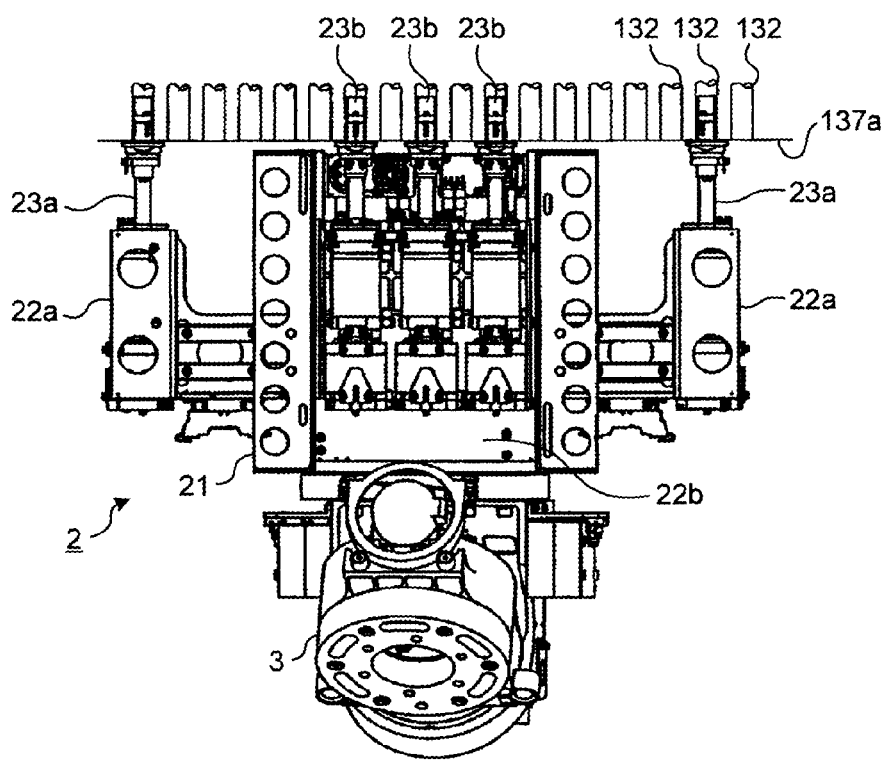
FIG. 19 is a front view of the base shown in FIG. 18.
Figure 20:
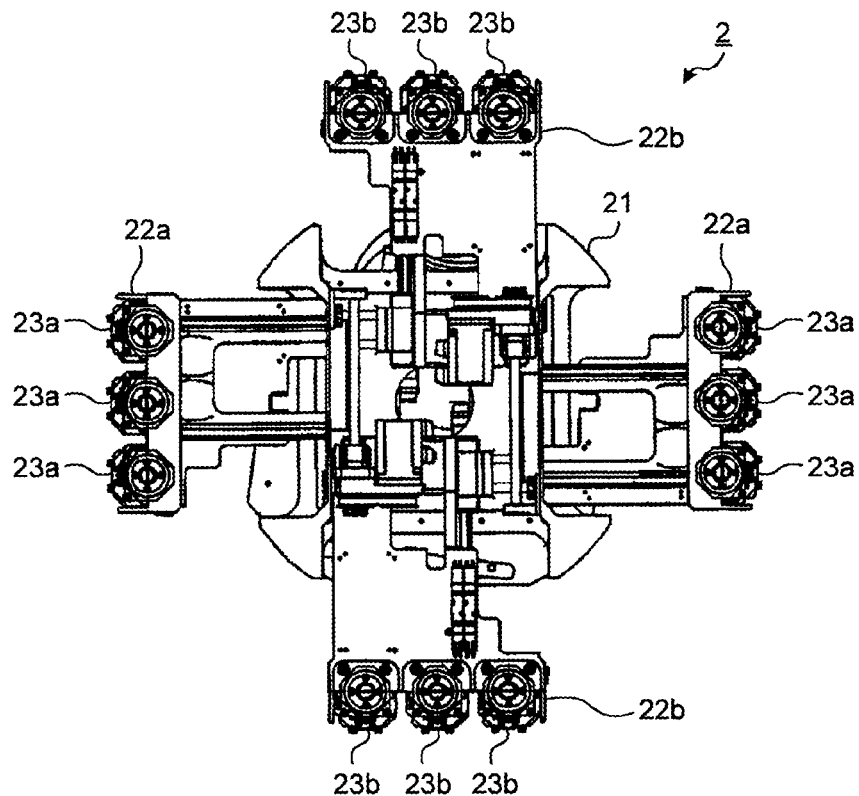
FIG. 20 is a plan view of the base shown in FIG. 18.
Figure 21:
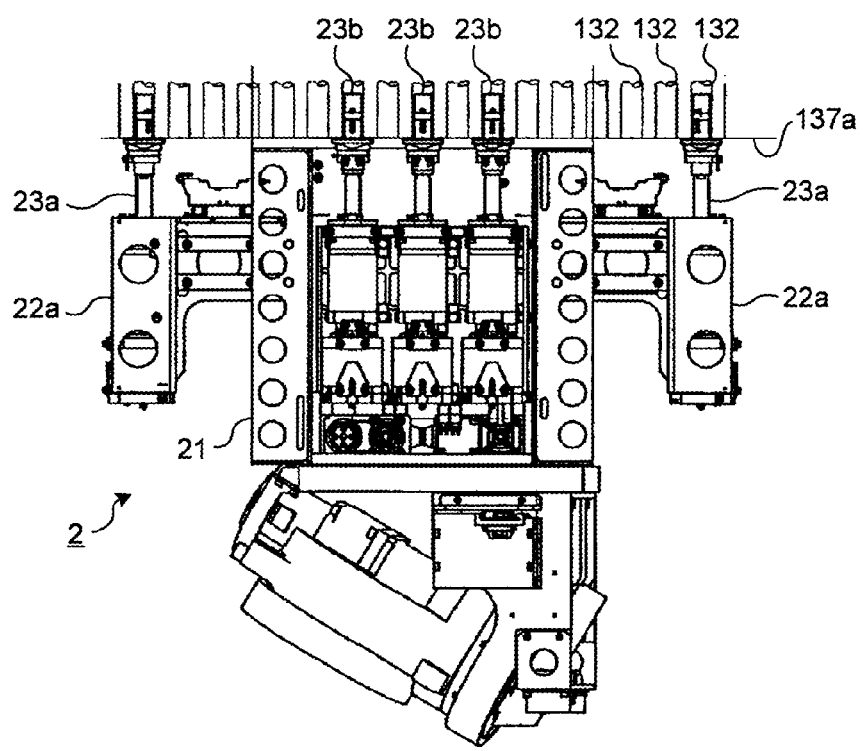
FIG. 21 is a right side view of the base shown in FIG. 18.
Figure 22:
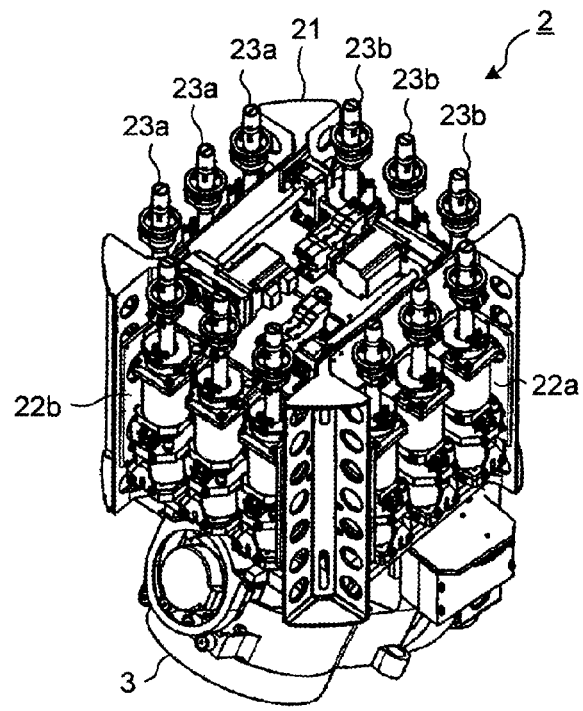
FIG. 22 is a perspective view of the base shown in FIG. 18.
Figure 23:
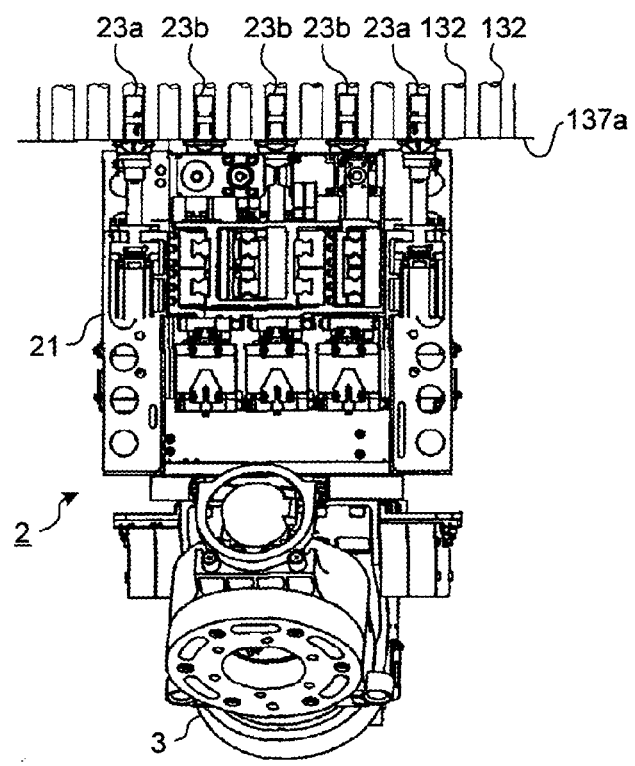
FIG. 23 is a right side view of the base shown in FIG. 18.
Figure 24:
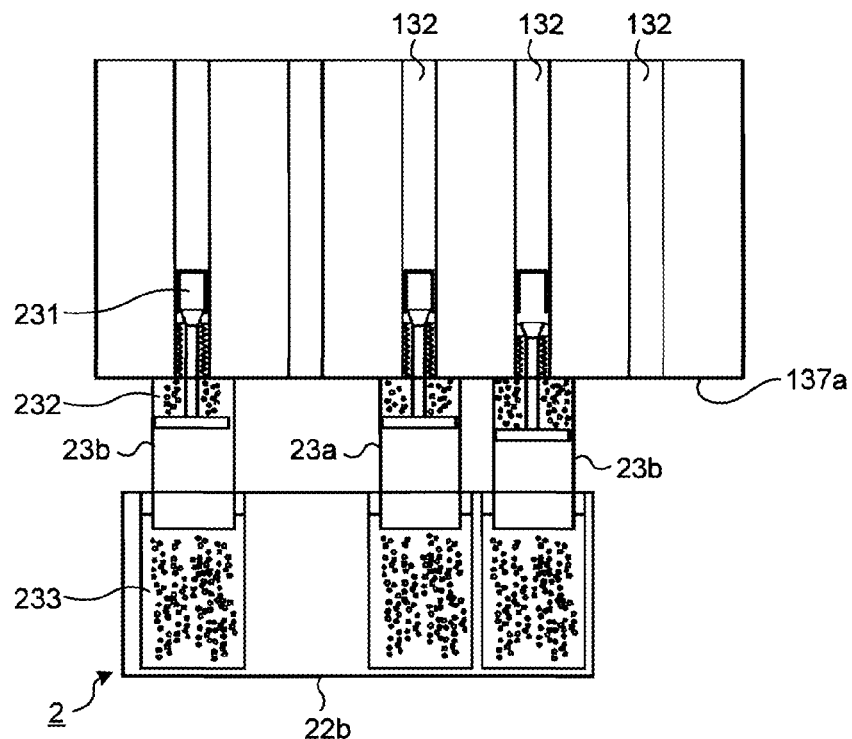
FIG. 24 is an explanatory diagram of a walking logic of a base.

FIG. 18 is a perspective view of an Example of the base of the water-chamber working apparatus shown in FIG. 1. FIG. 18 depicts an assembly of the base 2 and the intermediate link 3, and also depicts a state where the wings 22a and 22b of the base 2 are opened. FIGS. 19 to 21 are, respectively, a front view (FIG. 19), a plan view (FIG. 20), and a right side view (FIG. 21) of the base shown in FIG. 18. These drawings depict a state where the base 2 clamps the heat transfer tubes 132 on the tube plate surface 137a. FIGS. 22 and 23 are, respectively, a perspective view (FIG. 22) and a right side view (FIG. 23) of the base shown in FIG. 18. These drawings depict a state where the wings 22a and 22b of the base 2 are closed.

In this Example, the base body 21 is formed of a substantially cubic frame member (see FIGS. 18 to 23). The base 2 has two sets of the wings 22a, 22a and 22b, 22b, designating a pair of the wings 22a and 22a, and 22b and 22b as a set. These wings 22a and 22b are respectively inserted from the four sides of the base body 21 and arranged. These wings 22a and 22b are arranged slidably (to be able to move forward and backward) with respect to the base body 21, so that the wings 22a and 22b can protrude and can be accommodated from the sides of the base body 21 mutually independently. Furthermore, the wings 22a and 22b are driven mutually independently by an actuator accommodated in the base body 21. In this configuration, when the base 2 opens the wings 22a and 22b, the wings 22a and 22b are slidably displaced and protrude from the sides of the base body 21. Furthermore, when the base 2 closes the wings 22a and 22b, the wings 22a and 22b are accommodated in the base body 21.

Three clampers 23a and 23b as a set are brought into line and arranged on the wings 22a and 22b, matched with an installation interval of the heat transfer tubes 132 (see FIGS. 18 to 23). The clampers 23a and 23b include a clamping mechanism 231, a grip cylinder mechanism 232, and a main cylinder mechanism 233 (not shown. See FIGS. 24 to 33). The clamping mechanism 231 is arranged at the apical ends of the clampers 23a and 23b, and is inserted into the heat transfer tube 132 to enlarge or reduce a diameter thereof, thereby clamping the heat transfer tube 132. Specifically, the clamping mechanism 231 is formed of a tapered rod and a cotter. When the tapered rod is fitted to the cotter to open the cotter, the clamping mechanism 231 enlarges the diameter thereof to clamp the heat transfer tube 132 (clamping state: ON). Furthermore, when the tapered rod is pulled out from the cotter, the clamping mechanism 231 reduces the diameter thereof to release clamping to the heat transfer tube 132 (clamping state: OFF). The grip cylinder mechanism 232 drives the tapered rod of the clamping mechanism 231 to switch ON/OFF of the clamping state of the clamping mechanism 231 (enlarging and reducing of the diameter). Specifically, the grip cylinder mechanism 232 is formed of a cylinder, which uses the tapered rod of the clamping mechanism 231 as a piston. In a state where the clamping mechanism 231 is inserted into the heat transfer tube 132, when the grip cylinder mechanism 232 pulls in the tapered rod of the clamping mechanism 231 from a side of the heat transfer tube 132, the clamping state of the clamping mechanism 231 becomes ON. When the grip cylinder mechanism 232 pushes the tapered rod of the clamping mechanism 231 toward the heat transfer tube 132, the clamping state of the clamping mechanism 231 becomes OFF. The main cylinder mechanism 233 displaces the grip cylinder mechanism 232 forward and backward so that the clamping mechanism 231 is inserted into or pulled out of the heat transfer tube 132. Specifically, in a state where the base 2 is installed on the tube plate surface 137a, when the main cylinder mechanism 233 pushes up the grip cylinder mechanism 232, the grip cylinder mechanism 232 abuts on the tube plate surface 137a, and the clamping mechanism 231 is inserted into the heat transfer tube 132. Furthermore, when the main cylinder mechanism 233 pulls down the grip cylinder mechanism 232, the grip cylinder mechanism 232 is separated from the tube plate surface 137a and the clamping mechanism 231 is pulled out from the heat transfer tube 132.

[Walking Logic of Base]

FIGS. 24 to 33 are explanatory diagrams of a walking logic of the base. These drawings depict an Example of a basic operation of the wings 22a and 22b and the clampers 23a and 23b, when the base 2 walks on the tube plate surface 137a. The walking logic of the base 2 is not limited to the Example.

In this Example, the base 2 moves along the tube plate surface 137a by sequentially moving the clamping positions of the clampers 23a and 23b with respect to the heat transfer tubes 132, while slidably displacing the wings 22a and 22b that are orthogonal to each other alternately. Furthermore, the pair of wings 22a, 22a and 22b, 22b facing each other are driven simultaneously. In this Example, a case where the base 2 moves from left to right in the drawings is explained (see FIGS. 24 to 33).

In a suspended state of the base 2, the base 2 inserts the apical ends of all the clampers 23a and 23b into the heat transfer tubes 132 to clamp the heat transfer tubes 132 (see FIGS. 19, 21, and 23). At this time, at each of the clampers 23a and 23b, the main cylinder mechanism 233 pushes up the grip cylinder mechanism 232, and the grip cylinder mechanism 232 pulls in the tapered rod of the clamping mechanism 231 from the heat transfer tube 132, and thus the clamping state of the clamping mechanism 231 becomes ON (see FIG. 24). In this state, the base 2 is firmly fixed to the tube plate surface 137a.

Figure 25:
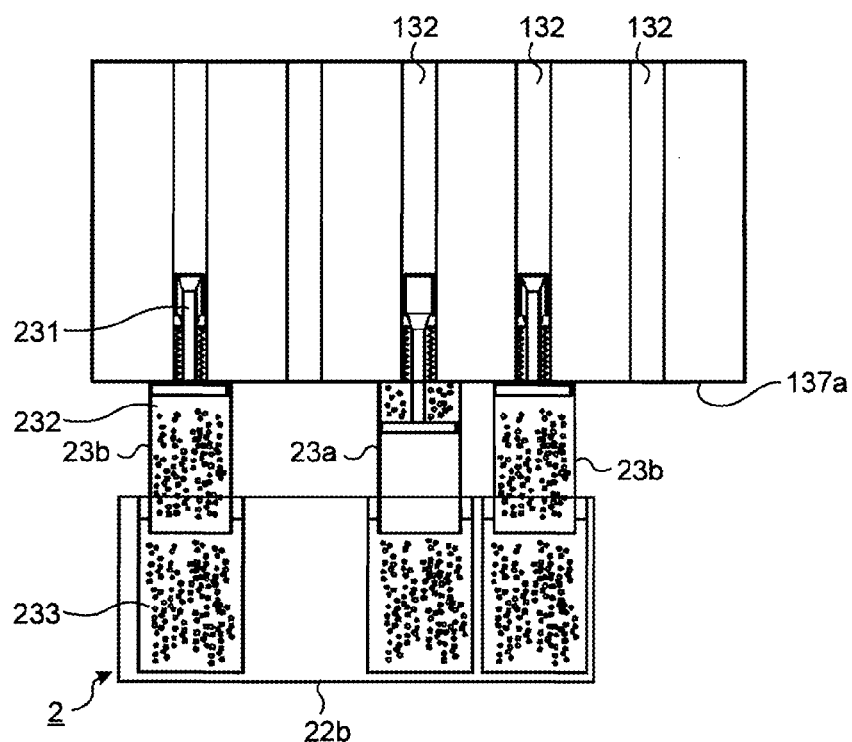
FIG. 25 is an explanatory diagram of a walking logic of the base.

When the base 2 moves, first, the grip cylinder mechanism 232 pushes the tapered rod of the clamping mechanism 231 into the heat transfer tube 132 at the clampers 23b of the wings 22b that can be slidably displaced in the moving direction of the base 2 (see FIG. 25). The clamping state of the clamping mechanism 231 then becomes OFF. Subsequently, the main cylinder mechanism 233 pulls down the grip cylinder mechanism 232 at the clampers 23b (see FIG. 26). In this state, the base body 21 is supported by the clampers 23a (clamping state: ON) of the remaining wings 22a (not shown). The wings 22b having the clampers 23b with the clamping state being OFF are then slidably displaced in the moving direction of the base 2 (see FIG. 27).

Figure 28:
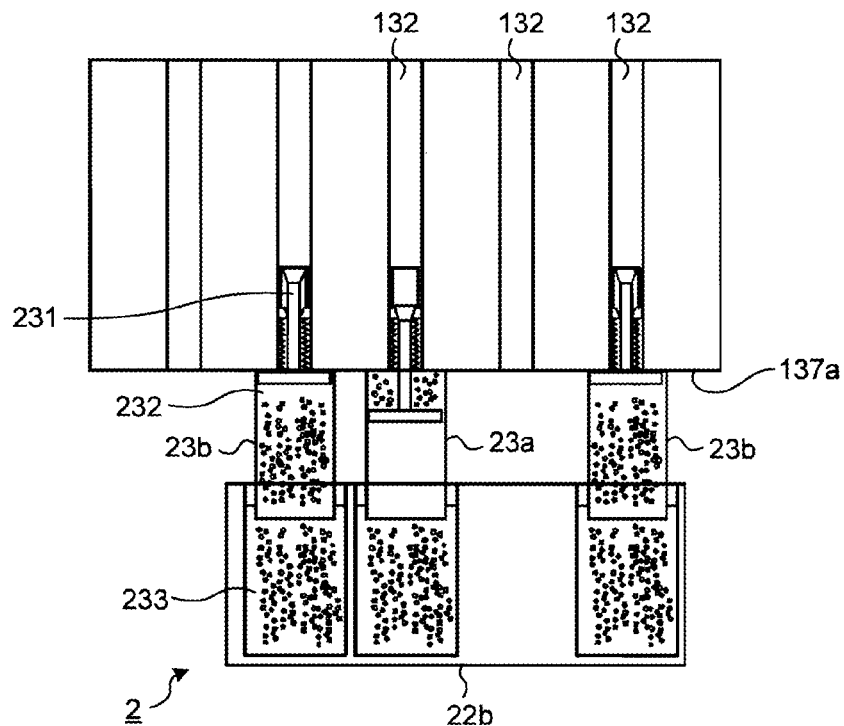
FIG. 28 is an explanatory diagram of a walking logic of the base.

Subsequently, the main cylinder mechanism 233 pushes up the grip cylinder mechanism 232 at these moved clampers 23b so as to abut on the tube plate surface 137a (see FIG. 28). When the grip cylinder mechanism 232 pulls in the tapered rod of the clamping mechanism 231 from the heat transfer tube 132, the clamping state of the clamping mechanism 231 becomes ON. With this configuration, the clamping state of all the clampers 23a and 23b becomes ON.

Figure 29:
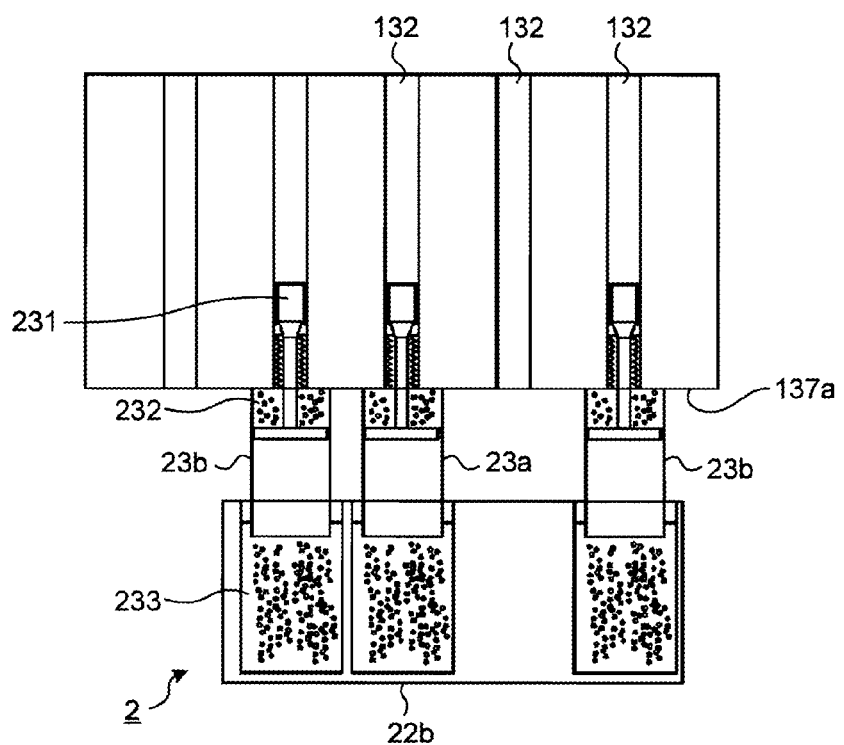
FIG. 29 is an explanatory diagram of a walking logic of the base.
Figure 30:
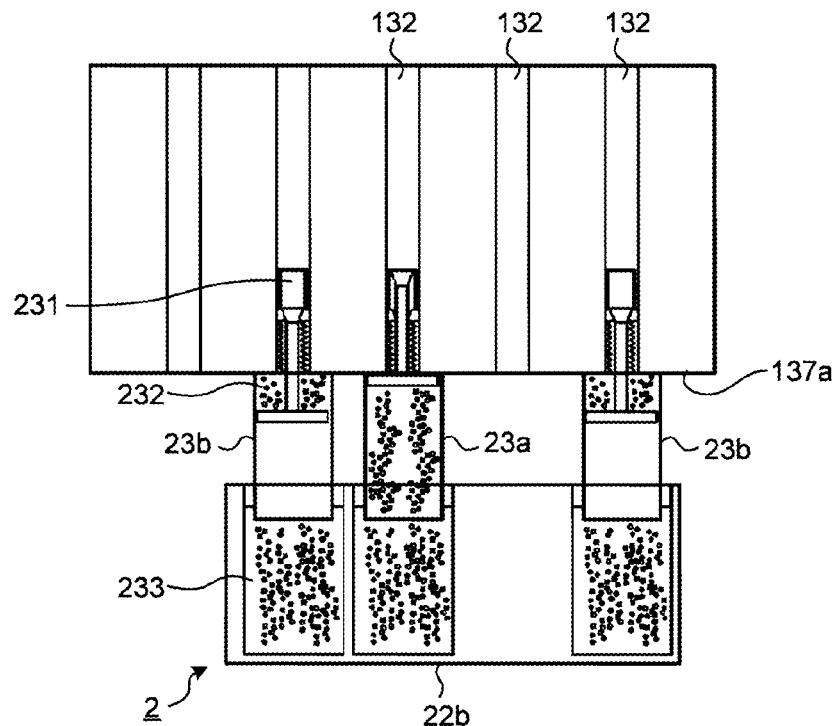
FIG. 30 is an explanatory diagram of a walking logic of the base.

Subsequently, the grip cylinder mechanism 232 pushes the tapered rod of the clamping mechanism 231 toward the heat transfer tube 132 at the clampers 23a of the wings 22a (not shown) in a direction orthogonal to the moving direction of the base 2 (see FIG. 29). The clamping state of the clamping mechanism 231 then becomes OFF. The main cylinder mechanism 233 then pulls down the grip cylinder mechanism 232 at these clampers 23a (see FIG. 30). In this state, the base body 21 is supported by the clampers 23b of the remaining wings 22b in the moving direction.

Figure 31:
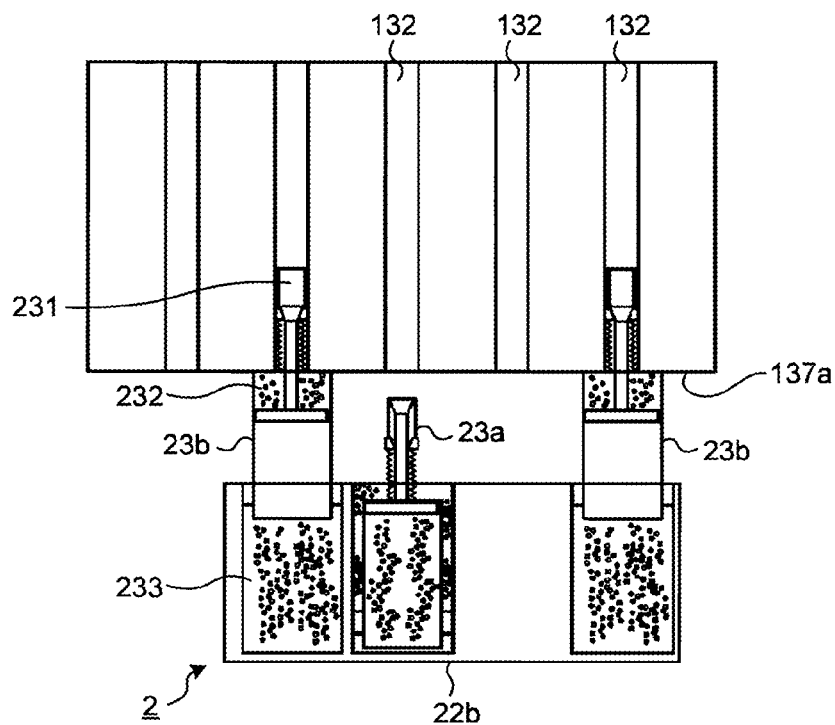
FIG. 31 is an explanatory diagram of a walking logic of the base.
Figure 32:
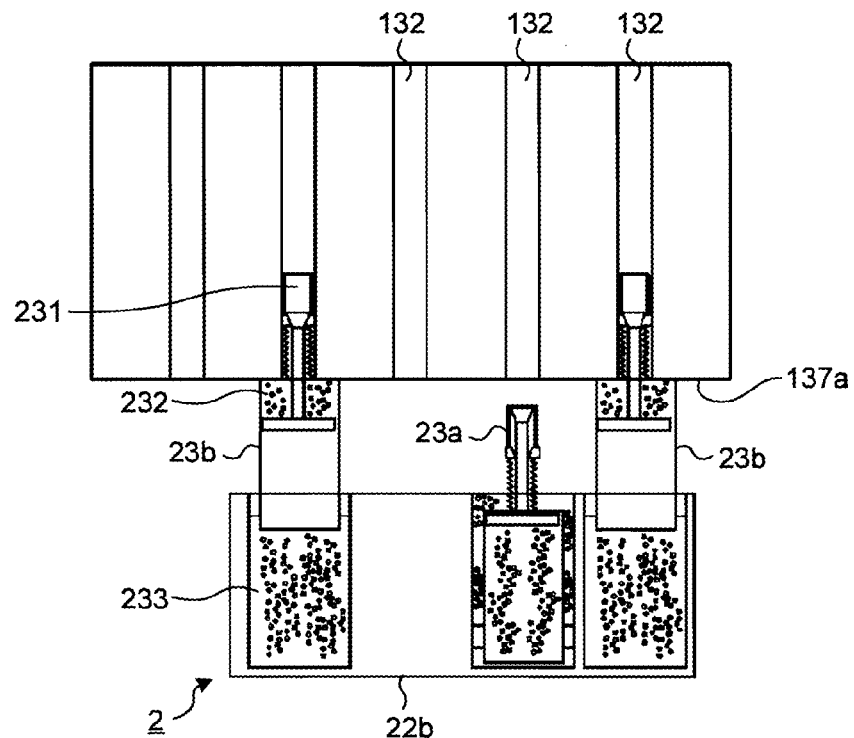
FIG. 32 is an explanatory diagram of a walking logic of the base.

Subsequently, the base body 21 and the wings 22a with the clamping state being OFF (not shown) are slidably displaced in the moving direction of the base (see FIG. 31). Specifically, the wings 22b with the clamping state being ON is driven and slidably displaced in a direction opposite to the moving direction of the base 2, thereby mutually displacing the base body 21 and the wings 22a (not shown) with respect to the wings 22b with the clamping state being OFF. With this configuration, the base 2 moves with respect to the tube plate surface 137a (see FIG. 32).

Figure 33:
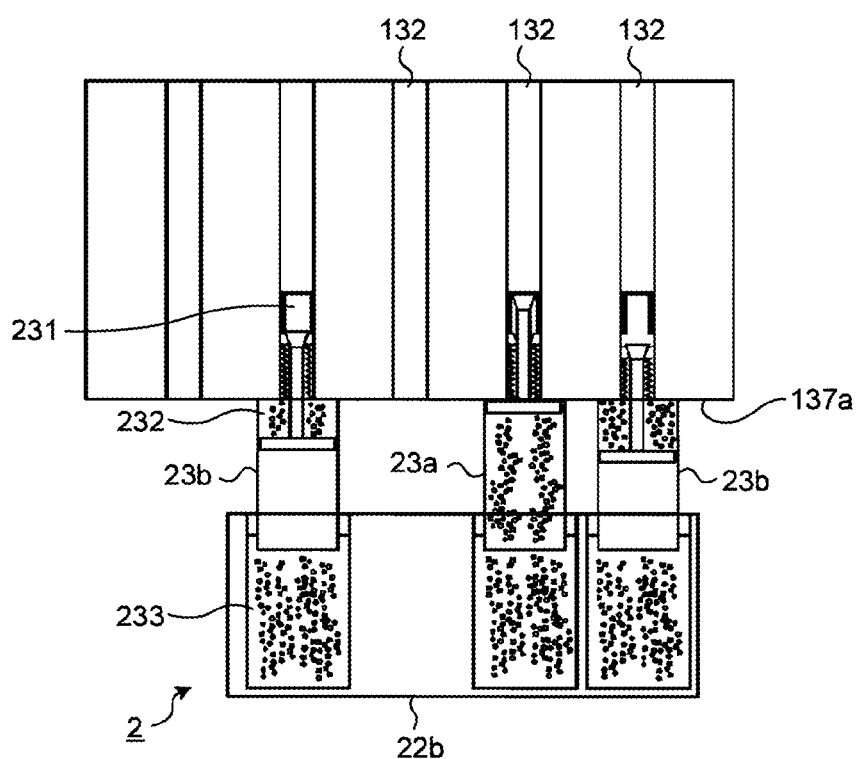
FIG. 33 is an explanatory diagram of a walking logic of the base.

The main cylinder mechanism 233 then pushes up the grip cylinder mechanism 232 at the clampers 23a having moved together with the base body 21 to abut on the tube plate surface 137a (see FIG. 33). When the grip cylinder mechanism 232 pulls in the tapered rod of the clamping mechanism 231 from a side of the heat transfer tube 132, the clamping state of the clamping mechanism 231 becomes ON (refer back to FIG. 24). With this configuration, the clamping state of all the clampers 23a and 23b becomes ON, and the base 2 returns to the initial suspended state.

By repeating the above operation, the base 2 can move an arbitrary distance along the tube plate surface 137a. Furthermore, by using the wings 22a and 22b that are orthogonal to each other, the base 2 can move in an arbitrary direction on the tube plate surface 137a (see FIG. 3).

[Specific Example of Carrying Process of Water-Chamber Working Apparatus]

In a carrying process of the water-chamber working apparatus 1 (see FIG. 7), at the base installing step ST2 (see FIG. 7 and FIGS. 10 to 12), it is preferable that the base 2 (an assembled body of the base 2 and the intermediate link 3) is carried into the water chamber 134 in a state where all the wings 22a and 22b are closed (see FIG. 22). The assembled body 2, 3 is then made more compact than a case where the base 2 is carried in with a state where the wings 22a and 22b are opened (see FIG. 18), and thus a carrying work into the water chamber 134 and an installation work on the tube plate surface 137a of the base are facilitated.

Furthermore, at the time of performing an attachment work of the rear stage 42 and the front stage 41 of the manipulator 4 and the tool 5 (Steps ST4 and ST5) (see FIG. 7 and FIGS. 14 and 15), it is preferable that the base is installed on the tube plate surface 137a with all the wings 22a and 22b being opened (see FIGS. 19 to 21). Particularly, at the time of performing the attachment work of the front stage 41 of the manipulator 4 and the tool 5, the weight of the manipulator 4 acts on the clampers 23a and 23b of the base. Therefore, at the time of performing the attachment work, the base 2 is in a state where all the wings 22a and 22b are opened, thereby enabling to reduce the moment acting on the base 2. With this configuration, it is possible to prevent detaching of clamping of the base 2 at the time of performing the attachment work of the manipulator 4.

Similarly, at the time of performing the replacement work of the tool 5, it is preferable that the base is installed on the tube plate surface 137a with all the wings 22a and 22b being opened (see FIGS. 19 to 21). With this configuration, the moment acting on the base 2 can be reduced, and thus it is possible to prevent detaching of clamping of the base 2 at the time of performing the replacement work of the tool 5.

Furthermore, at the time of performing the attachment work (Step ST5) and the replacement work of the tool 5, it is preferable to cancel energization of the manipulator 4. That is, it is preferable to perform the attachment work and the replacement work of the tool 5 in a state where a joint portion of the manipulator 4 is made flexible with respect to an external force. Accordingly, the moment acting on the base 2 can be reduced, and thus it is possible to prevent detaching of clamping of the base 2 at the time of performing the attachment work and the replacement work of the tool 5.

Further, at the time of performing a work in the water chamber (see FIG. 5), it is preferable that the base is installed on the tube plate surface 137a with all the wings 22a and 22b being opened (see FIGS. 19 to 21). Accordingly, the moment acting on the base 2 can be reduced, and it is possible to prevent detaching of clamping of the base 2 at the time of performing the work in the water chamber.

Figure 26:
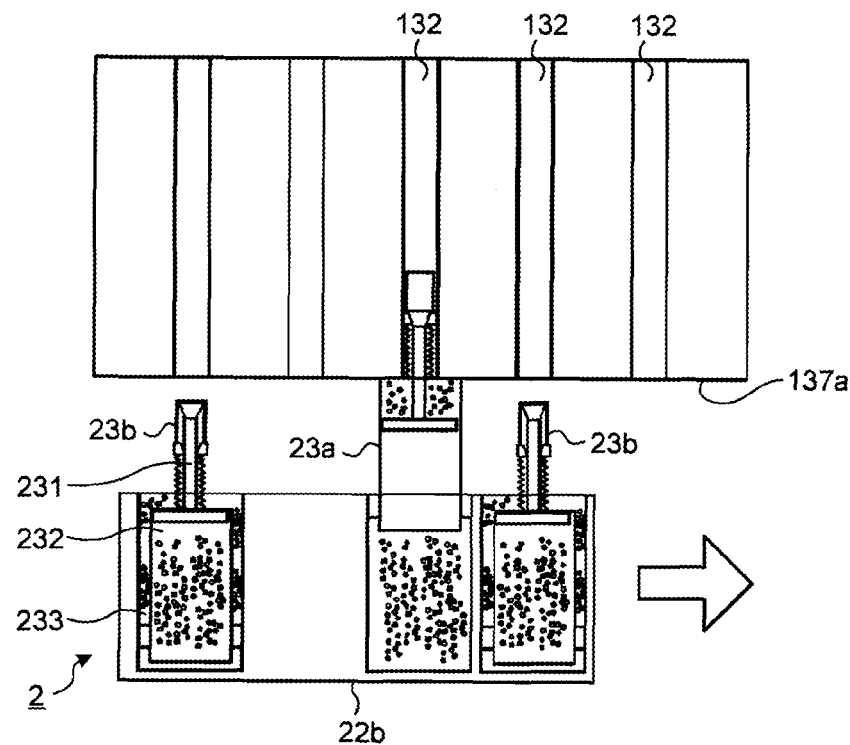
FIG. 26 is an explanatory diagram of a walking logic of the base.
Figure 27:
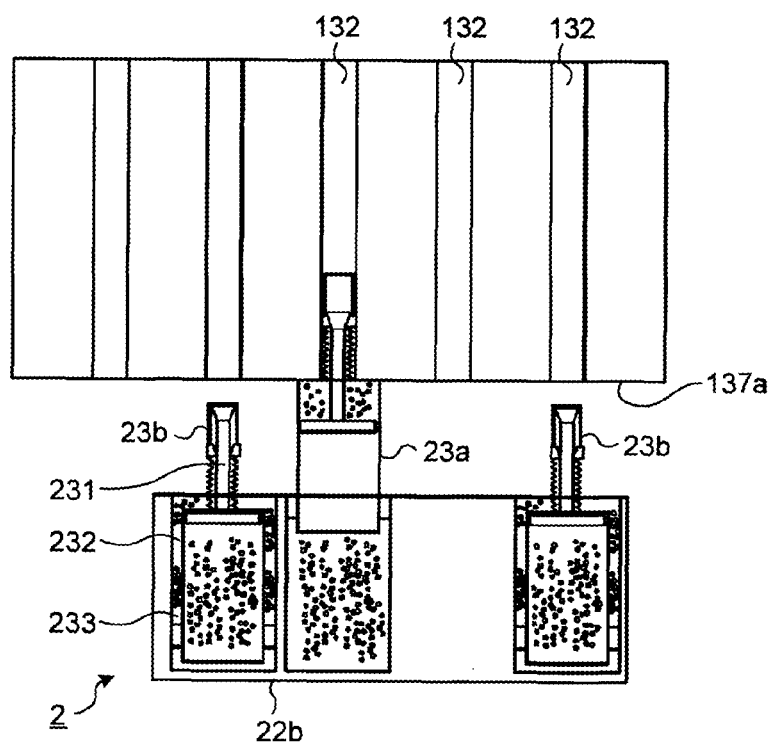
FIG. 27 is an explanatory diagram of a walking logic of the base.

Furthermore, at the time of moving the water-chamber working apparatus 1 (see FIG. 6), the clamping state of the base 2 becomes OFF at the wings 22a or 22b in one direction (for example, see FIG. 26 and FIG. 27). At this time, it is preferable that the barycenter of the manipulator 4 is arranged immediately below the base body 21 in a vertical direction (this arrangement is not shown). For example, at the time of moving the water-chamber working apparatus 1, the manipulator 4 first folds the front stage 41 (this state is not shown), so that the barycenter of the manipulator 4 becomes immediately below the base body 21 in a vertical direction, in a state where the base 2 is installed on the tube plate surface 137a with all the wings 22a and 22b being opened (see FIGS. 19 to 21). In this state, the base 2 is moved along the tube plate surface 137a (see FIGS. 24 to 33). With this configuration, the moment acting on the base 2 can be reduced, and thus it is possible to prevent detaching of clamping of the base 2 at the time of moving the water-chamber working apparatus 1.

[Effect]

As described above, according to the installation method of the water-chamber working apparatus 1, the water-chamber working apparatus 1 includes the base 2 that holds the heat transfer tubes 132 on the tube plate surface 137a and is fixed to the tube plate surface 137a, and the manipulator 4 that is coupled with the base 2, suspended in the water chamber 130 and arranged therein, and has a separable configuration. In this case, the base installing step ST2 of installing the base 2 on the tube plate surface 137a, and Steps ST4 and ST5 (manipulator coupling step) of carrying the separated manipulator 4 (the front stage 41 and the rear stage 42) into the water chamber 131, 133 sequentially and individually and coupling the manipulator 4 with the base 2 (the coupling link 3) are performed (see FIG. 7 and FIGS. 12 to 15). According to this configuration, in a configuration in which the manipulator 4 is suspended from the ceiling of the water chamber 131, 133 and arranged therein (FIG. 1), the installing process of the manipulator 4 is facilitated. For example, in a configuration in which a manipulator is carried into a water chamber in an integrated state and then installed, the weight of the manipulator becomes heavy, and thus a work for hoisting the manipulator to the ceiling of the water chamber is not easy.

According to the installation method of the water-chamber working apparatus 1, at the time of coupling the separated manipulator 4 (the rear stage 42) with the base 2 (the coupling link 3) (manipulator coupling step ST4), the attaching jig 13 is spanned from the base 2 on the tube plate surface 137a to the maintenance hatch 138 of the water chamber 131 and then installed (Step ST3), and the separated manipulator 4 is coupled with the base 2 (the coupling link 3), while being guided by the attaching jig 13 (see FIG. 7 and FIGS. 12 to 14). With this configuration, the attaching jig 13 is used as a guide, and the separated manipulator 4 is carried from the maintenance hatch 138 of the water chamber 131 to the position of the base 2. Accordingly, the heavy rear stage 42 can be easily carried from the maintenance hatch 138 to the base on the tube plate surface 137a.

According to the installation method of the water-chamber working apparatus 1, when the base 2 (and the coupling link 3) is installed on the tube plate surface 137a (base installing step ST2), the base 2 and the base carrying and attaching jig 11 installed on the tube plate surface 137a are connected with each other via the wire 12, and the base 2 is pulled up to the base carrying and attaching jig 11 by the wire 12 (FIGS. 9 to 11). With this configuration, the heavy base 2 can be easily pulled up to the tube plate surface 137a of the water chamber 131 and then installed.

According to the installation method of the water-chamber working apparatus, at the time of replacing the tool 5, the water-chamber working apparatus 1 projects the apical end from the maintenance hatch 138 of the water chamber 131, 133 to outside of the water chamber 131, 133, in a state being installed in the water chamber 131, 133 (see FIG. 1). In this state, the tool 5 attached to the apical end of the water-chamber working apparatus 1 (the manipulator 4) is replaced. Therefore, the replacement work of the tool 5 can be performed outside of the water chamber 131, 133, while the water-chamber working apparatus 1 is installed in the water chamber 131, 133. With this configuration, the replacement work of the tool 5 is facilitated.

According to the installation method of the water-chamber working apparatus, at the time of attaching or detaching the tool 5 (at the time of performing the attachment work (Step ST5), the time of performing a replacement work and the like), the joint portion of the manipulator 4 is made flexible with respect to an external force (this state is not shown). With this configuration, the moment acting on the base 2 can be reduced, and thus it is possible to prevent detaching of clamping of the base 2 at the time of performing an attachment work and a replacement work of the tool 5.

INDUSTRIAL APPLICABILITY

As described above, the installation method of a water-chamber working apparatus according to the present invention is useful such that an installing process of a manipulator is facilitated in a configuration in which the manipulator is suspended from a ceiling of a water chamber and arranged therein.

REFERENCE SIGNS LIST 1 water-chamber working apparatus
2 base
21 base body
22a, 22b wing
23a, 23b clamper
231 clamping mechanism
232 grip cylinder mechanism
233 main cylinder mechanism
24 winch
3 coupling link
31 mounting surface
4 manipulator
41 front stage
42 rear stage
5 tool
10 jig
11 base carrying and attaching jig
12 wire
13 attaching jig
14 jig
16 crane device
100 nuclear plant
110 reactor vessel
120 pressurizer
130 steam generator
131 inlet-side water chamber
132 heat transfer tube
133 outlet-side water chamber
134 partition plate 135 inlet nozzle
136 outlet nozzle
137 tube plate
137a tube plate surface
138 maintenance hatch
140 pump
150 primary coolant pipe

The invention claimed is:

1. An installation method of a water-chamber working apparatus that is suspended from a tube plate surface of a water chamber in a steam generator and driven by remote control to perform a work in the water chamber, the water-chamber working apparatus including a base that holds heat transfer tubes on the tube plate surface and is fixed to the tube plate surface, and a manipulator that is coupled with the base, suspended in the water chamber and arranged therein, and has a separable configuration, comprising:

installing an attaching jig including a wire on the tube plate surface;
   lifting the base by winching the wire;
   securing the base on the tube plate surface by inserting a plurality of clampers of the base into the heat transfer tubes;
   spanning between a maintenance hatch and a lower part of the base with the attaching jig which is formed of a long plate-like member curved in a circular arc shape; and
   carrying a rear stage of the manipulator from the maintenance hatch to the lower part of the base by sliding the rear stage on the attaching jig.

2. The installation method of a water-chamber working apparatus according to claim 1, wherein replacement of a tool attached to an apical end of the manipulator is performed in a state where the apical end of the manipulator is projected from the maintenance hatch of the water chamber to outside thereof while in a state of being suspended in the water chamber.

3. The installation method of a water-chamber working apparatus according to claim 1, wherein, at a time of attaching or detaching a tool, a joint portion of the manipulator is made flexible with respect to an external force.

* * * * *